United States Patent
Okada

(10) Patent No.: US 8,953,251 B2
(45) Date of Patent: Feb. 10, 2015

(54) ZOOM LENS AND IMAGE PICKUP APPARATUS EQUIPPED WITH ZOOM LENS

(75) Inventor: Takashi Okada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 13/487,759

(22) Filed: Jun. 4, 2012

(65) Prior Publication Data

US 2013/0033758 A1   Feb. 7, 2013

(30) Foreign Application Priority Data

Aug. 4, 2011 (JP) .................................. 2011-170956

(51) Int. Cl.
| | |
|---|---|
| *G02B 15/14* | (2006.01) |
| *G02B 15/16* | (2006.01) |
| *G02B 13/00* | (2006.01) |
| *G02B 15/17* | (2006.01) |
| *G02B 15/173* | (2006.01) |
| *G02B 13/12* | (2006.01) |

(52) U.S. Cl.
CPC ............ *G02B 15/161* (2013.01); *G02B 13/009* (2013.01); *G02B 13/0065* (2013.01); *G02B 15/17* (2013.01); *G02B 15/173* (2013.01); *G02B 13/12* (2013.01)
USPC ............................ 359/678; 359/686; 359/695

(58) Field of Classification Search
CPC ........ G02B 15/14; G02B 15/15; G02B 15/16; G02B 15/161; G02B 15/163; G02B 15/167; G02B 15/17; G02B 15/173; G02B 15/20
USPC ......... 359/676, 678, 680, 682–687, 693–695; 348/335–337, 240.99–240.3
See application file for complete search history.

(56) References Cited

U.S. PATENT DOCUMENTS

| | | | |
|---|---|---|---|
| 5,572,277 A | 11/1996 | Uzawa et al. | |
| 7,889,436 B2 | 2/2011 | Wada | |
| 7,982,970 B2 | 7/2011 | Wada | |
| 2009/0040625 A1* | 2/2009 | Shinohara et al. | 359/687 |
| 2010/0328783 A1 | 12/2010 | Wada | |
| 2011/0051257 A1* | 3/2011 | Wada et al. | 359/683 |
| 2012/0019929 A1* | 1/2012 | Fujisaki | 359/683 |

FOREIGN PATENT DOCUMENTS

| | | |
|---|---|---|
| CN | 101587233 A | 11/2009 |
| CN | 101655600 A | 2/2010 |
| CN | 102004303 A | 4/2011 |
| JP | 2007-279541 A | 10/2007 |
| JP | 2011-123515 A | 6/2011 |

* cited by examiner

*Primary Examiner* — Thomas K Pham
*Assistant Examiner* — Cara Rakowski
(74) *Attorney, Agent, or Firm* — Canon USA, Inc., IP Division

(57) ABSTRACT

A zoom lens includes, in order from an object side to an image side, a first lens unit of a positive refractive power, a second lens unit of a negative refractive power, a reflective unit configured to bend an optical axis, and a rear lens group including two or more lens units, the reflective unit being stationary during zooming, the first and second lens units and two or more lens units of the rear lens group being moved during zooming, wherein the following conditions are satisfied: $4.3 < \beta 2t/\beta 2w < 12.0$, and $2.1 < \beta Rt/\beta Rw < 3.0$, where $\beta 2w$ and $\beta 2t$ denote lateral magnifications of the second lens unit at a wide-angle end and a telephoto end, respectively, and $\beta Rw$ and $\beta Rt$ denote lateral magnifications at the wide-angle end and the telephoto end, respectively, of a lens unit having a greatest variable power contribution out of the rear lens group.

13 Claims, 26 Drawing Sheets

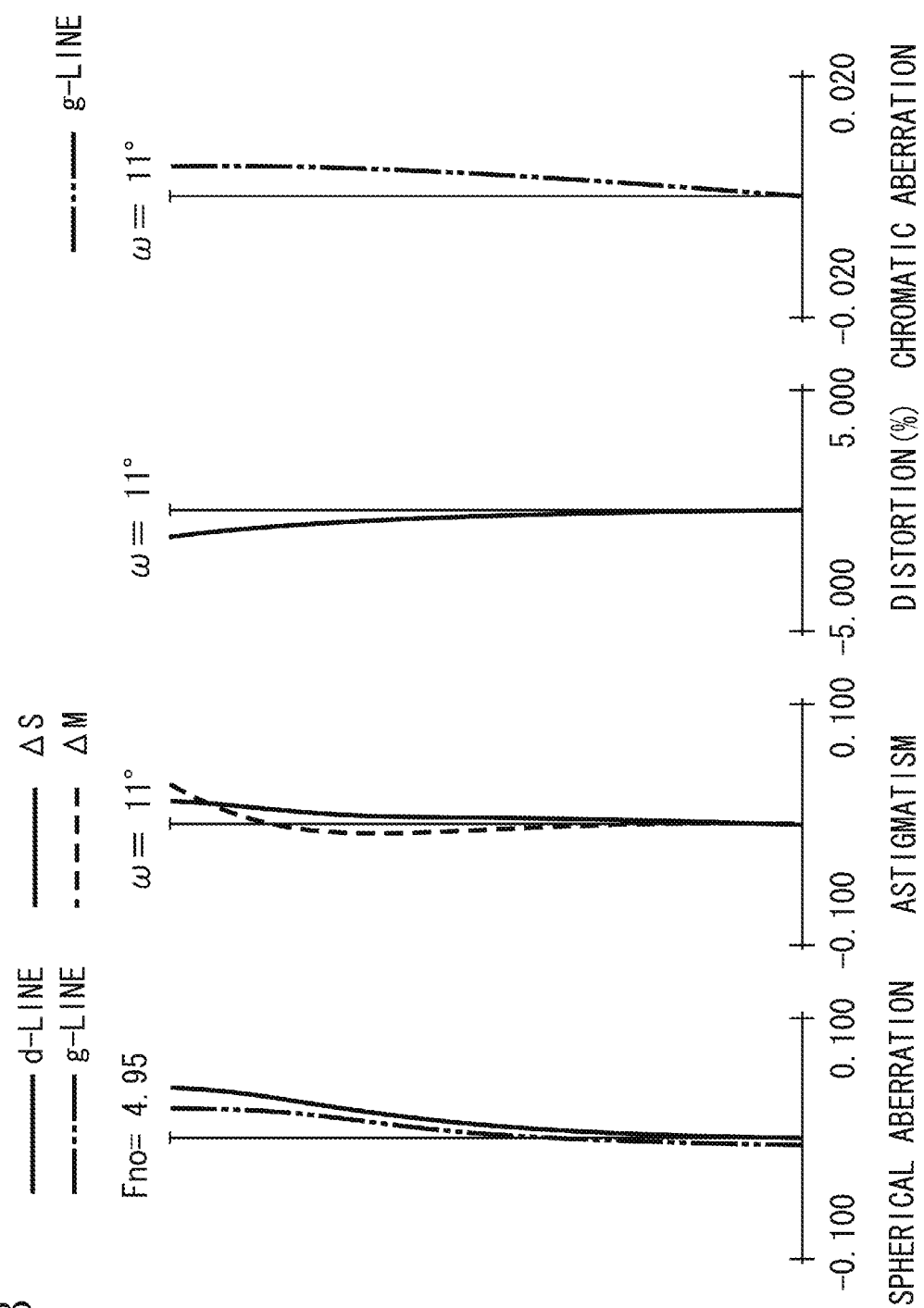

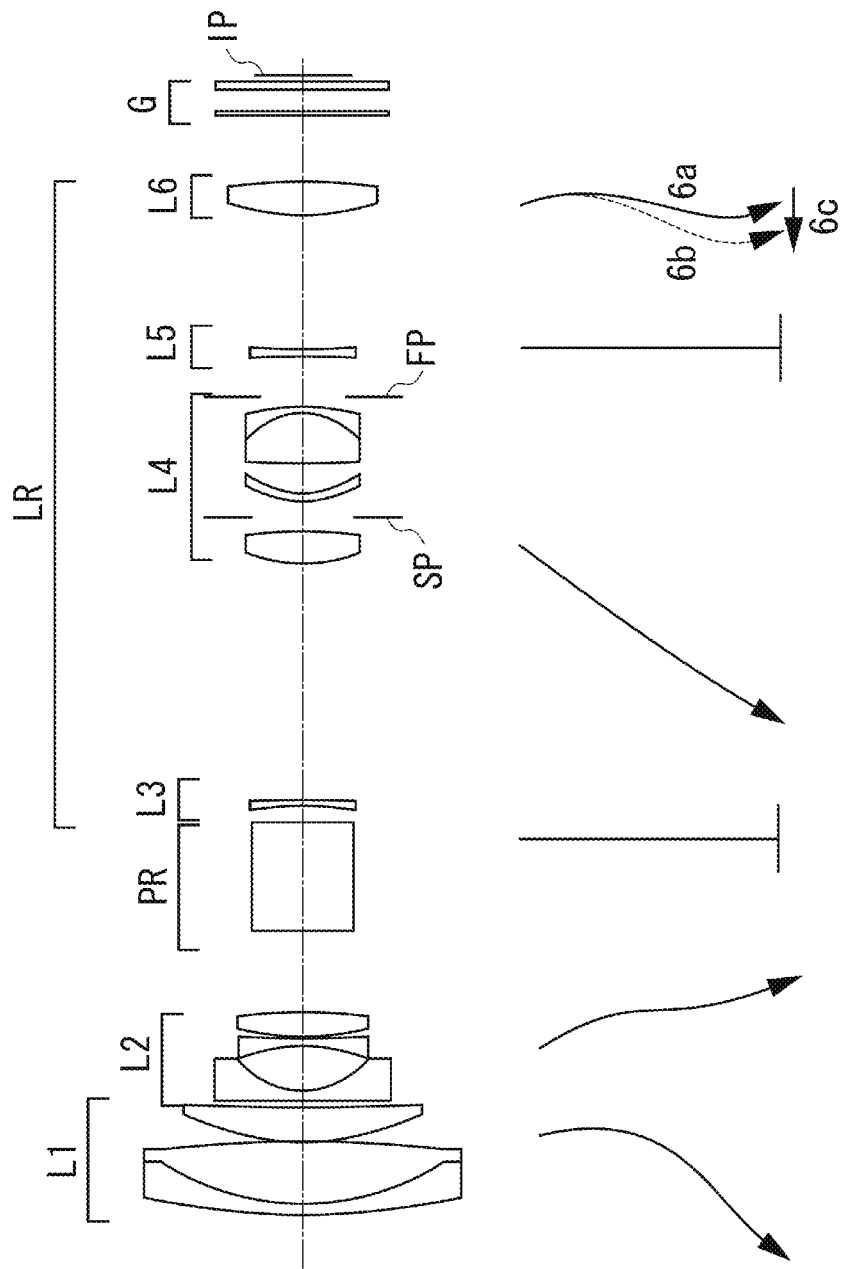

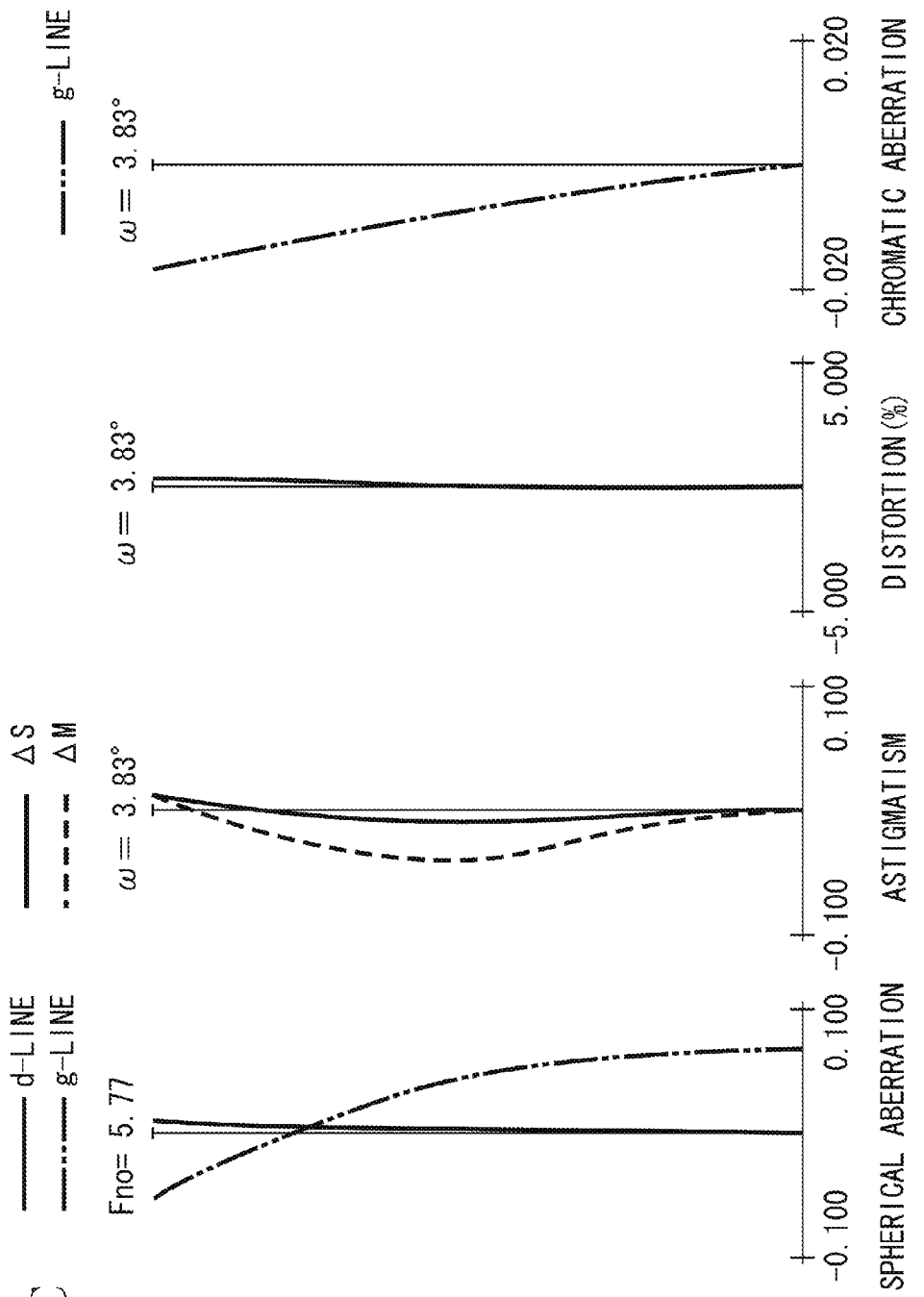

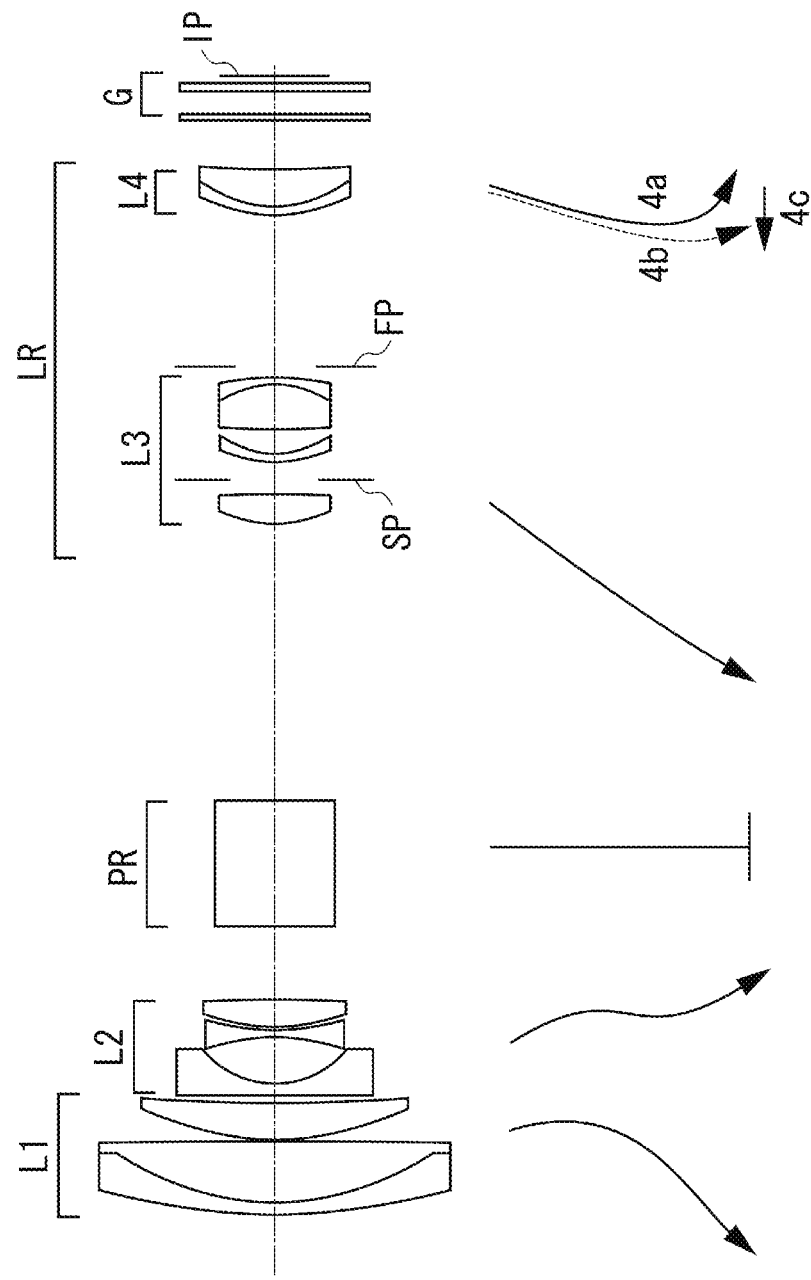

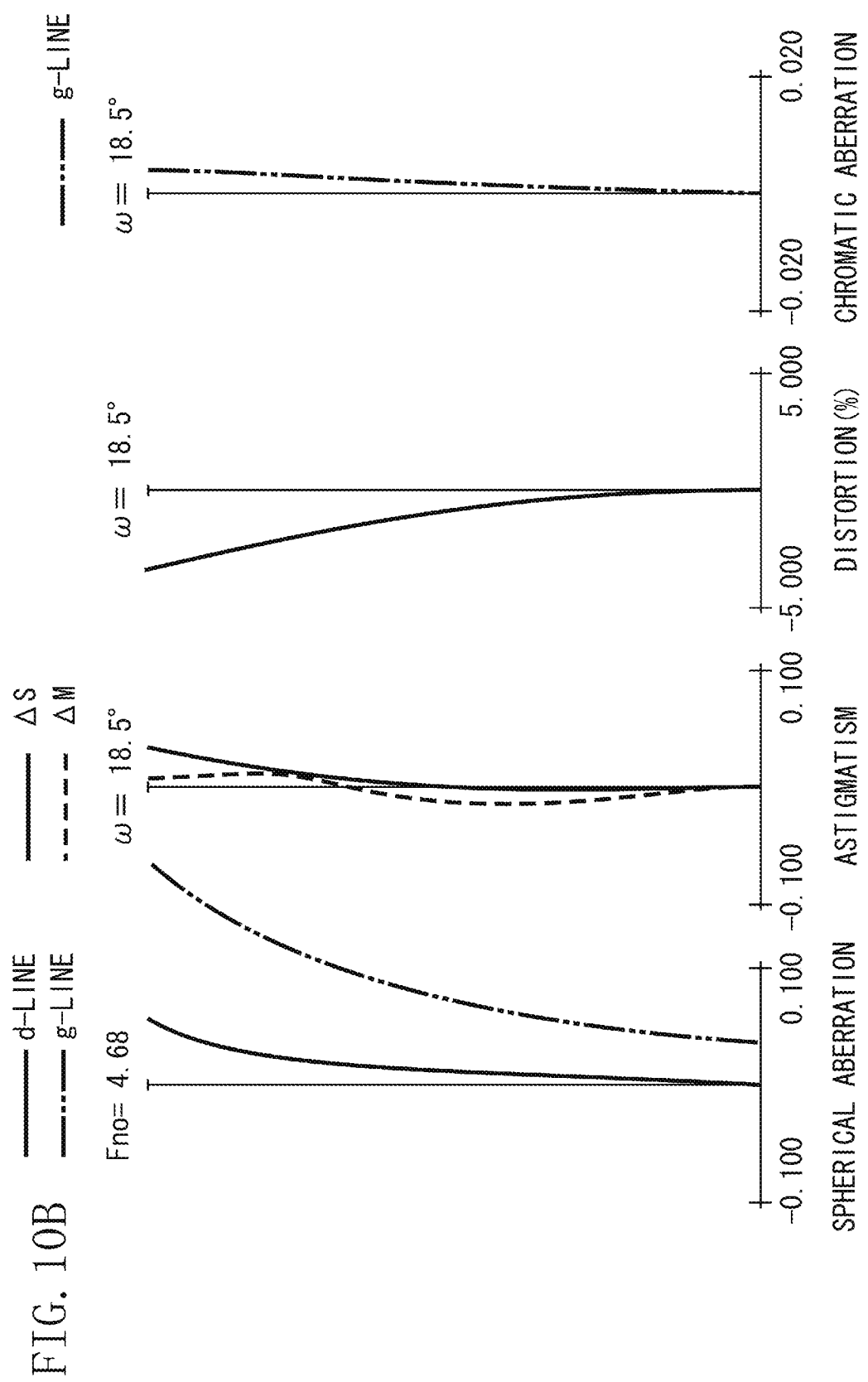

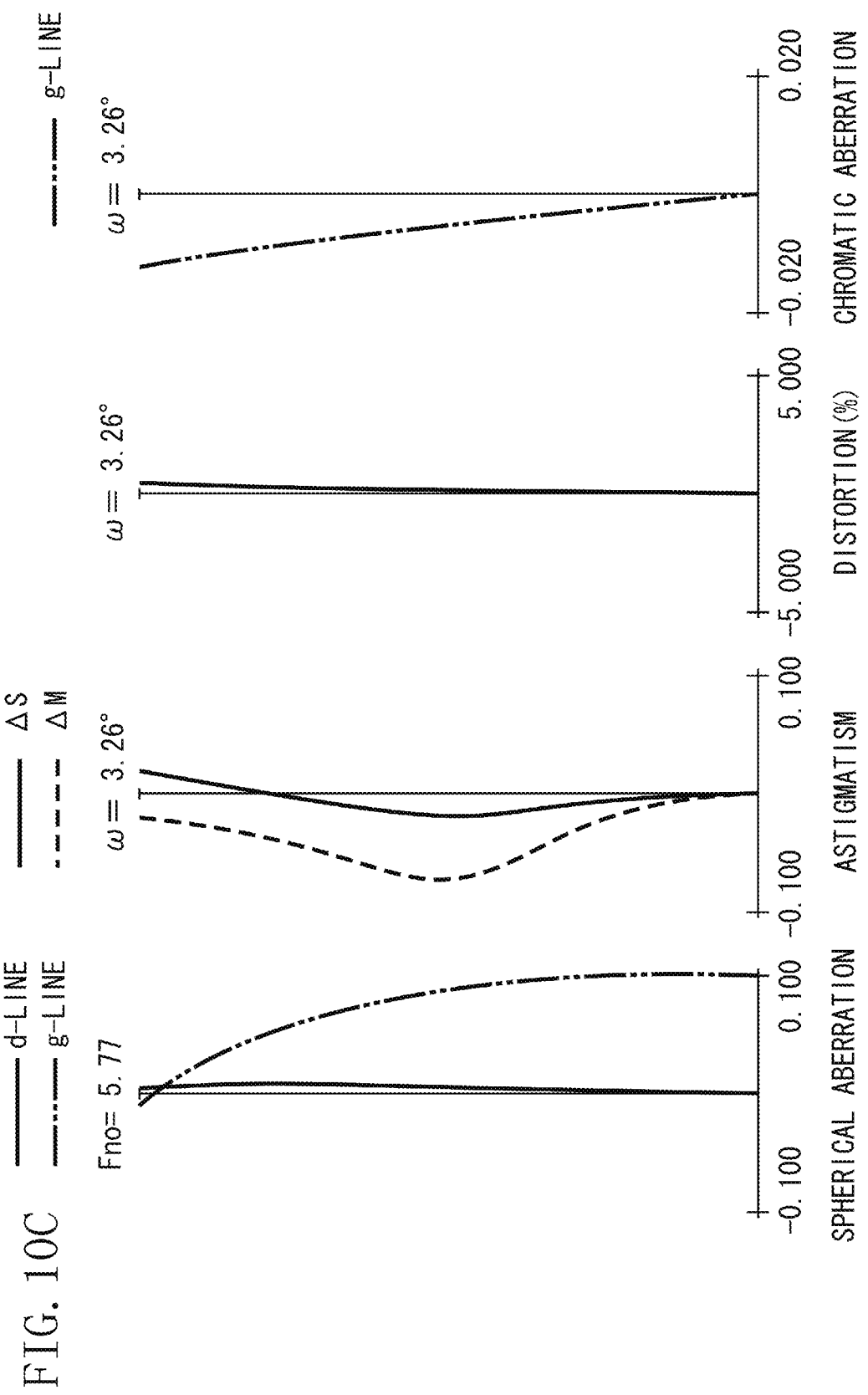

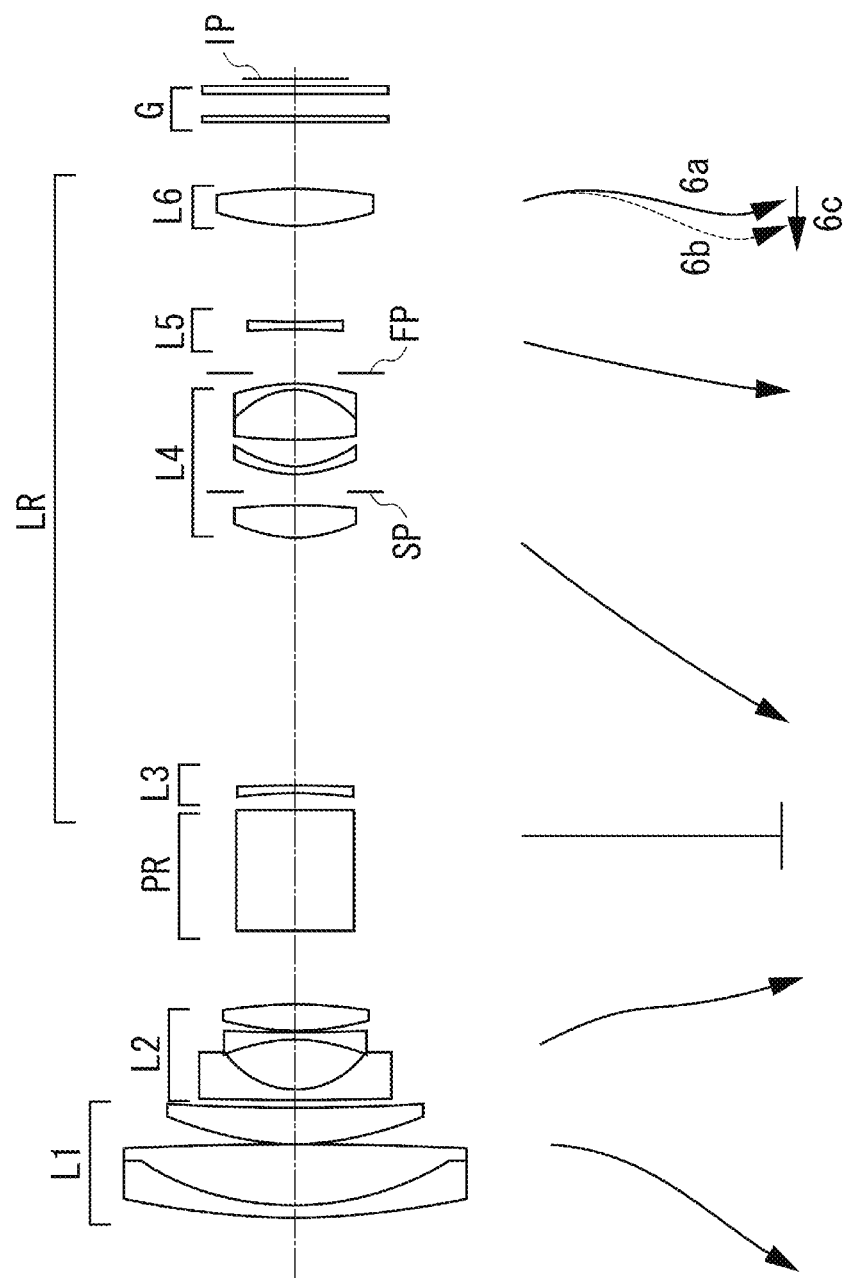

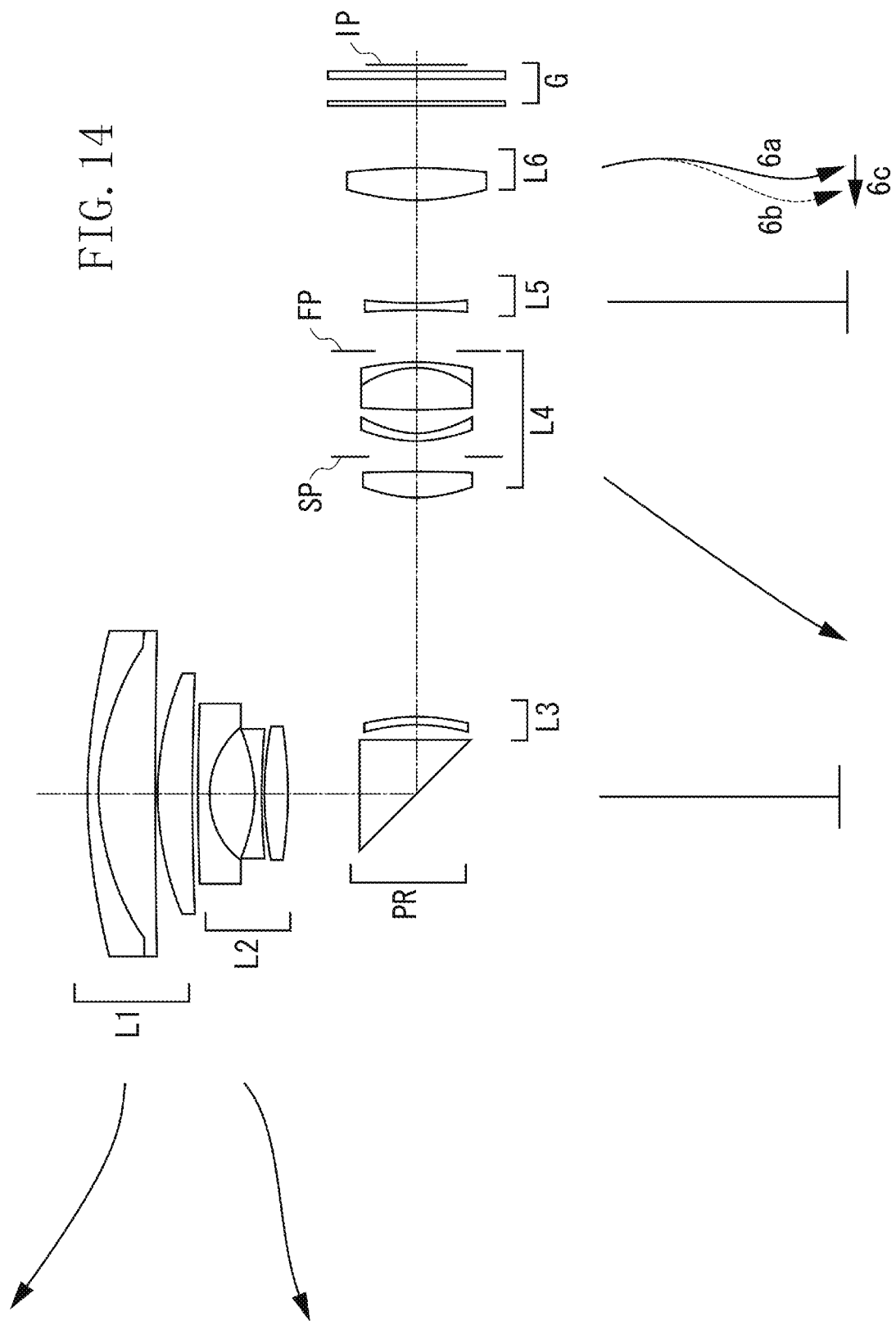

ZOOM LENS AND IMAGE PICKUP APPARATUS EQUIPPED WITH ZOOM LENS

BACKGROUND OF THE INVENTION

1. Field of the Invention

The present invention relates to a zoom lens and an image pickup apparatus equipped with the zoom lens, and more particularly, to a zoom lens suitable for a video camera, a digital camera, a monitoring camera, a silver-halide film camera, a broadcasting camera, and the like.

2. Description of the Related Art

In recent years, as an image pickup apparatus has been miniaturized with a high functionality, a photographic optical system used in the image pickup apparatus is required to have a zoom lens that is miniaturized in entirety and is capable of reducing a thickness of the camera with a high zoom ratio.

In order to implement a high zoom ratio and a miniaturized camera at the same time, there is known a retractable zoom lens, which can be stored in a camera casing when it is not used by reducing a distance between each lens unit up to a distance different from that of the imaging state. In addition, in order to reduce a thickness of the camera, there is known an optical-axis-bending zoom lens, in which a reflective member for bending an optical axis (optical path) of the photographic optical system by 90° such as a prism member using internal reflection is arranged in the middle of the optical path.

U.S. Pat. No. 7,982,970 discusses a four-unit zoom lens including first to fourth lens units of positive, negative, positive, and positive refractive powers, respectively, in order from an object side to an image side, in which an optical-axis-bending reflective member is arranged between the second and third lens units.

U.S. Pat. No. 7,889,436 discusses a five-unit zoom lens including first to fifth lens units of positive, negative, negative, positive, and positive refractive powers or positive, negative, negative, positive, and negative refractive powers in order from an object side to an image side, in which the optical-axis-bending reflective member is arranged between the second and third lens units.

In general, it is effective to increase the refractive powers (optical power=inverse of focal length) of each lens unit and reduce the number of lenses in the zoom lens to miniaturize the zoom lens. However, in such a zoom lens, as the refractive powers of each lens surface increase, the lens thickness increases in order to obtain an edge thickness. In particular, a front lens effective diameter (effective diameter of the first lens unit) increases, so that it is difficult to reduce the entire lens length. In addition, various types of aberration such as chromatic aberration increase at a telephoto end, and correction of such aberration is difficult.

In this regard, in order to implement a high zoom ratio and miniaturization of the entire zoom lens, it is important to appropriately set refractive powers, image-forming magnifications, and the like of each lens unit.

In a zoom lens having an optical-axis-bending reflective member between the lens units, a thin thickness of the camera can be easily obtained by arranging lens units in a thickness direction of the camera and a direction perpendicular thereto. However, it is important to appropriately set a configuration of the zoom lens to obtain such advantages. For example, it is important to appropriately set the arrangement of the reflective member in the middle of the optical path, movement amounts of each lens unit during zooming, and the like. In particular, if the refractive power of each lens unit, a movement amount of the zoom lens unit during zooming, and the like are not appropriate, various types of aberration increase significantly during zooming, and it is difficult to miniaturize the entire zoom lens with a high zoom ratio.

SUMMARY OF THE INVENTION

The present invention is directed a zoom lens and an image pickup apparatus equipped with the zoom lens, capable of easily obtaining an excellent image with a high zoom ratio and reducing a camera thickness when it is applied to a camera.

According to an aspect of the present invention, a zoom lens includes, in order from an object side to an image side, a first lens unit of a positive refractive power, a second lens unit of a negative refractive power, a reflective unit configured to bend an optical axis, and a rear lens group including two or more lens units, the reflective unit being stationary during zooming, the first and second lens units and two or more lens units of the rear lens group being moved during zooming, wherein the following conditions are satisfied:

$$4.3 < \beta 2t/\beta 2w < 12.0,$$

and $$2.1 < \beta Rt/\beta Rw < 3.0,$$

where $\beta 2w$ and $\beta 2t$ denote lateral magnifications of the second lens unit at a wide-angle end and a telephoto end, respectively, and $\beta Rw$ and $\beta Rt$ denote lateral magnifications at the wide-angle end and the telephoto end, respectively, of a lens unit having a greatest variable power contribution out of the rear lens group.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C are aberration diagrams of the zoom lens according to the first exemplary embodiment at the wide-angle end, the middle zoom position, and the telephoto end, respectively, in Numerical Example 1.

FIG. 3 is a lens cross-sectional view illustrating a zoom lens according to a second exemplary embodiment of the invention at a wide-angle end.

FIGS. 6A, 6B, and 6C are aberration diagrams of the zoom lens according to the third exemplary embodiment of the invention at the wide-angle end, the middle zoom position, and the telephoto end, respectively, in Numerical Example 3.

FIG. 7 is a lens cross-sectional view illustrating a zoom lens according to a fourth exemplary embodiment of the invention at a wide-angle end.

FIGS. 10A, 10B, and 10C are aberration diagrams of the zoom lens according to the fifth exemplary embodiment of the invention at the wide-angle end, the middle zoom position, and the telephoto end, respectively, in Numerical Example 5.

FIG. 11 is a lens cross-sectional view illustrating a zoom lens according to a sixth exemplary embodiment of the invention at a wide-angle end.

FIG. 14 is a lens cross-sectional view illustrating a zoom lens according to the first exemplary embodiment.

DESCRIPTION OF THE EMBODIMENTS

Various exemplary embodiments, features, and aspects of the invention will be described in detail below with reference to the drawings.

A zoom lens according to an exemplary embodiment of the invention includes a first lens unit of a positive refractive power, a second lens unit of a negative refractive power, a reflective unit configured to bend an optical axis, and a rear lens group including two or more lens units, in order from an object side to an image side. During zooming, the reflective unit is stationary, and the first and second lens units and two or more lens units of the rear lens group are moved.

Alternatively, the zoom lens according to an exemplary embodiment of the invention includes a first lens unit of a positive refractive power, a second lens unit of a negative refractive power, a third lens unit of a negative refractive power, a reflective unit configured to bend an optical axis, a rear lens group including two or more lens units, in order from an object side to an image side. In addition, during zooming, the reflective unit is stationary, and the first and second lens units and two or more lens units of the rear lens group are moved. The reflective unit may be a reflective mirror or a prism having an internal reflective surface.

Figure 1:
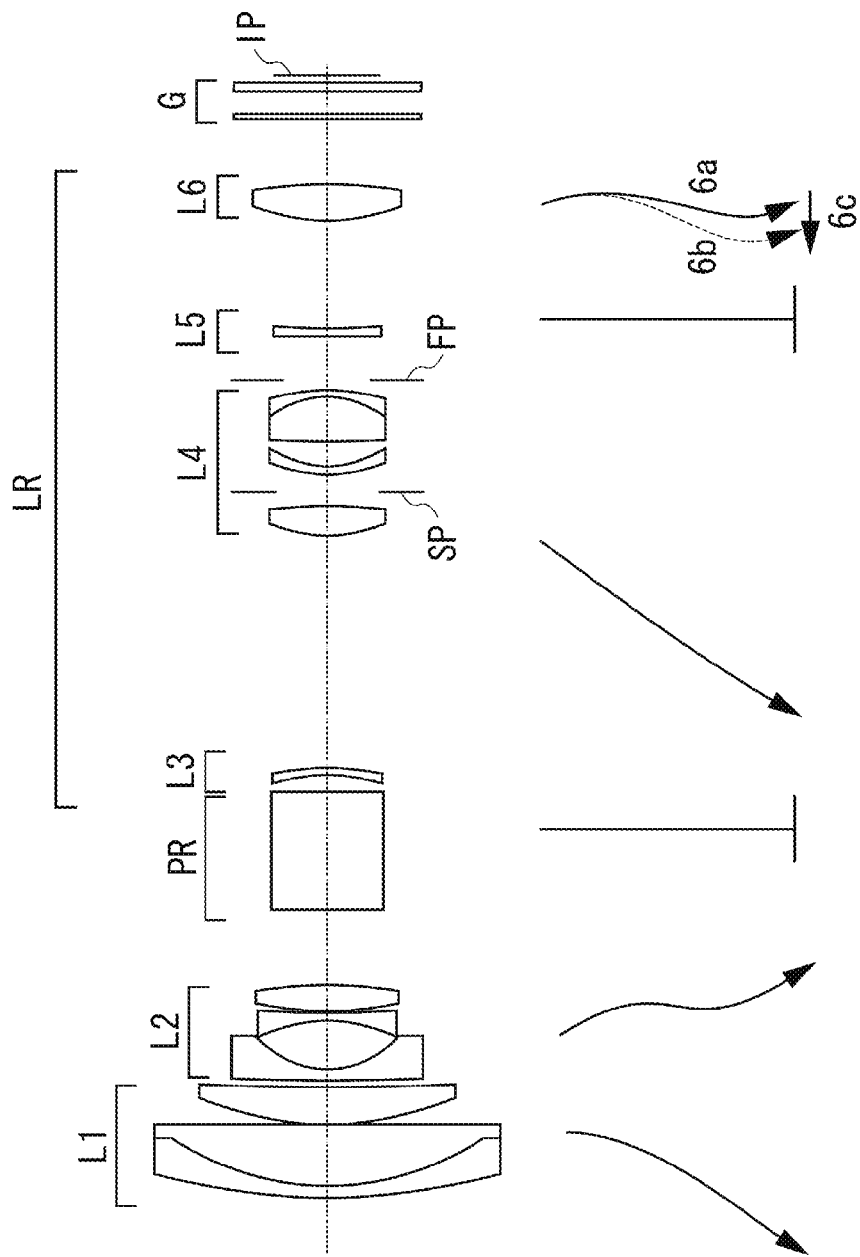
FIG. 1 is a lens cross-sectional view illustrating a zoom lens according to a first exemplary embodiment of the invention at a wide-angle end.
Figure 2A:
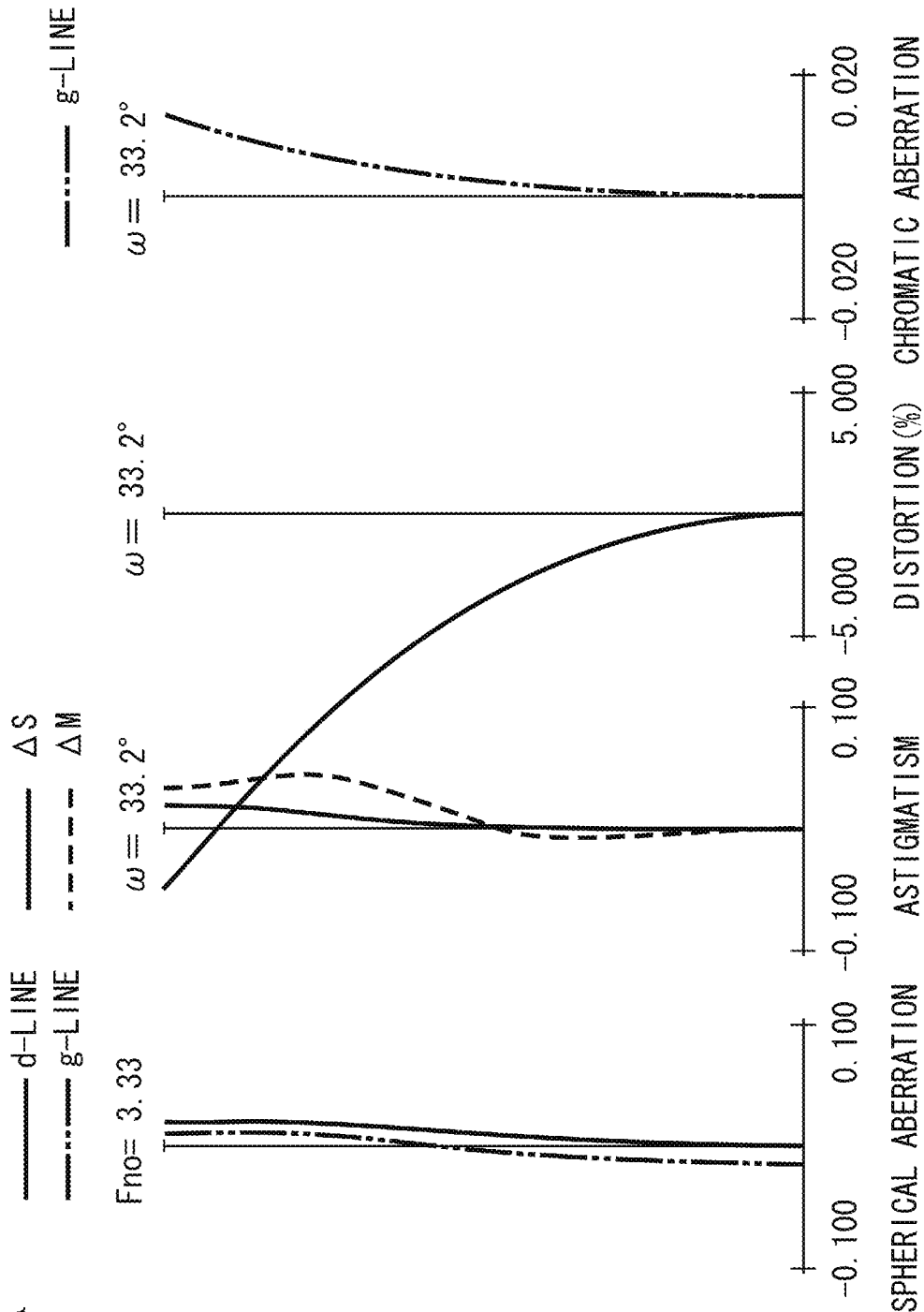
Figure 2C:
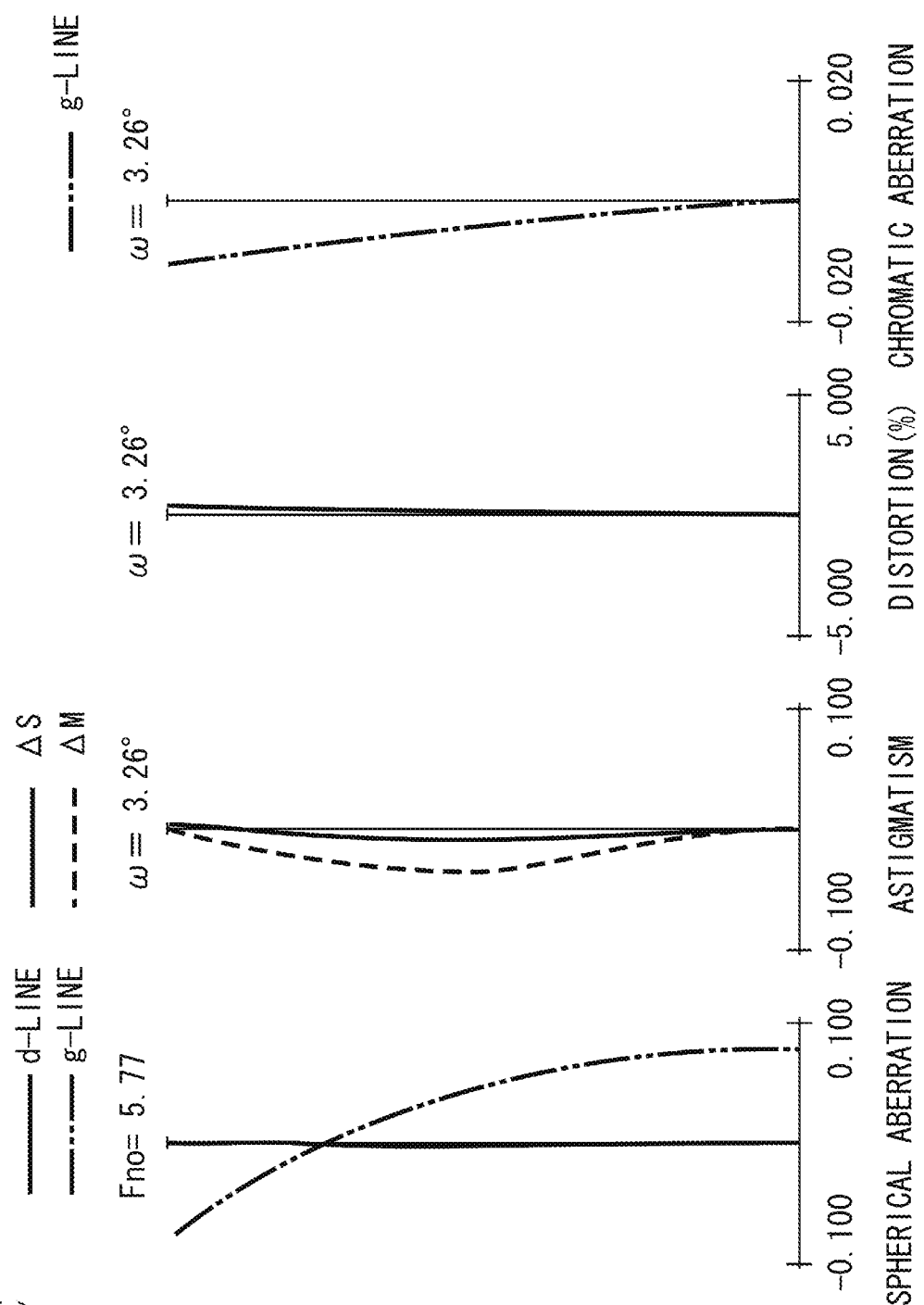
Figure 4A:
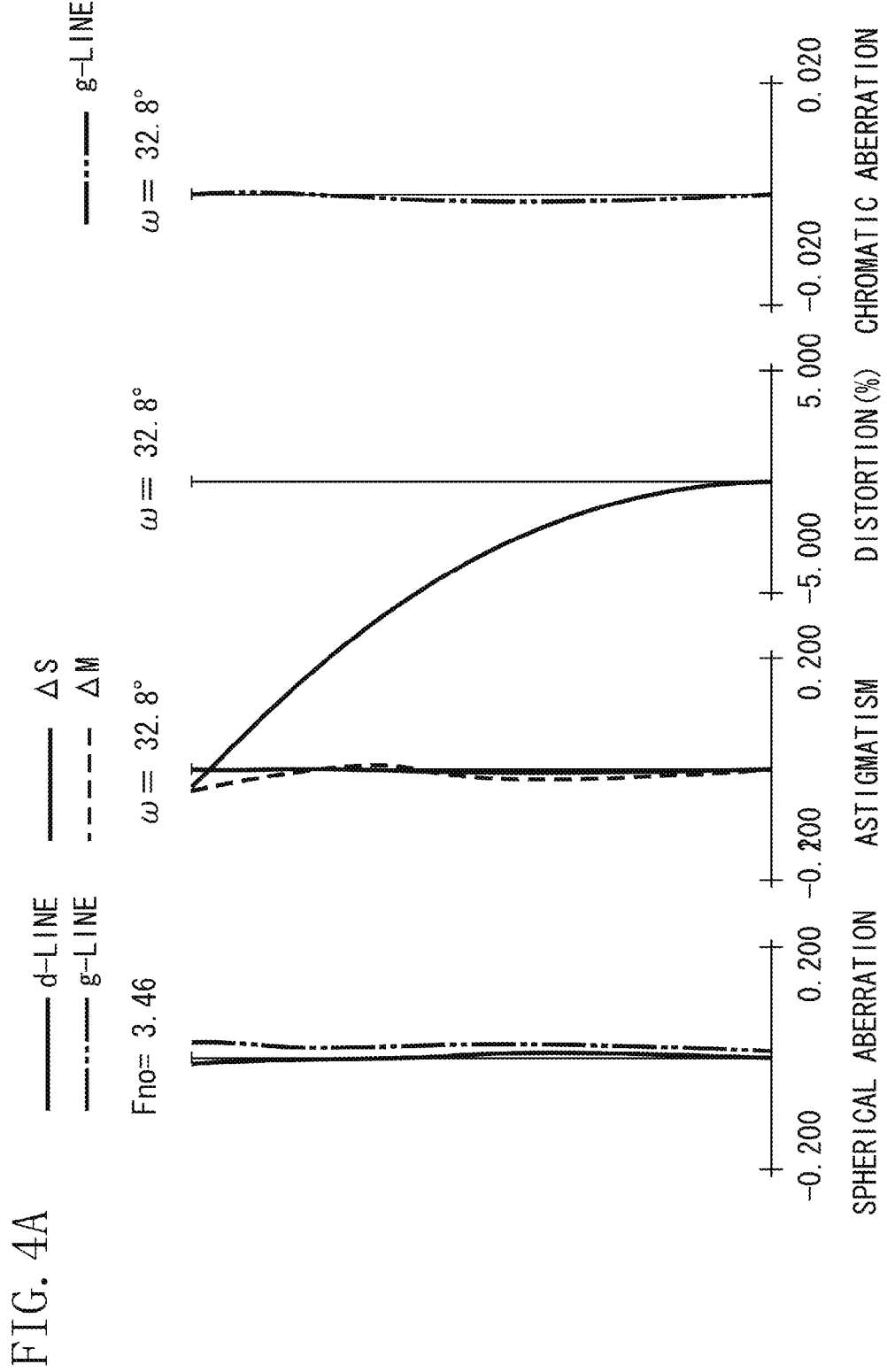
FIGS. 4A, 4B, and 4C are aberration diagrams of the zoom lens according to the second exemplary embodiment of the invention at the wide-angle end, the middle zoom position, and the telephoto end, respectively, in Numerical Example 2.
Figure 4B:
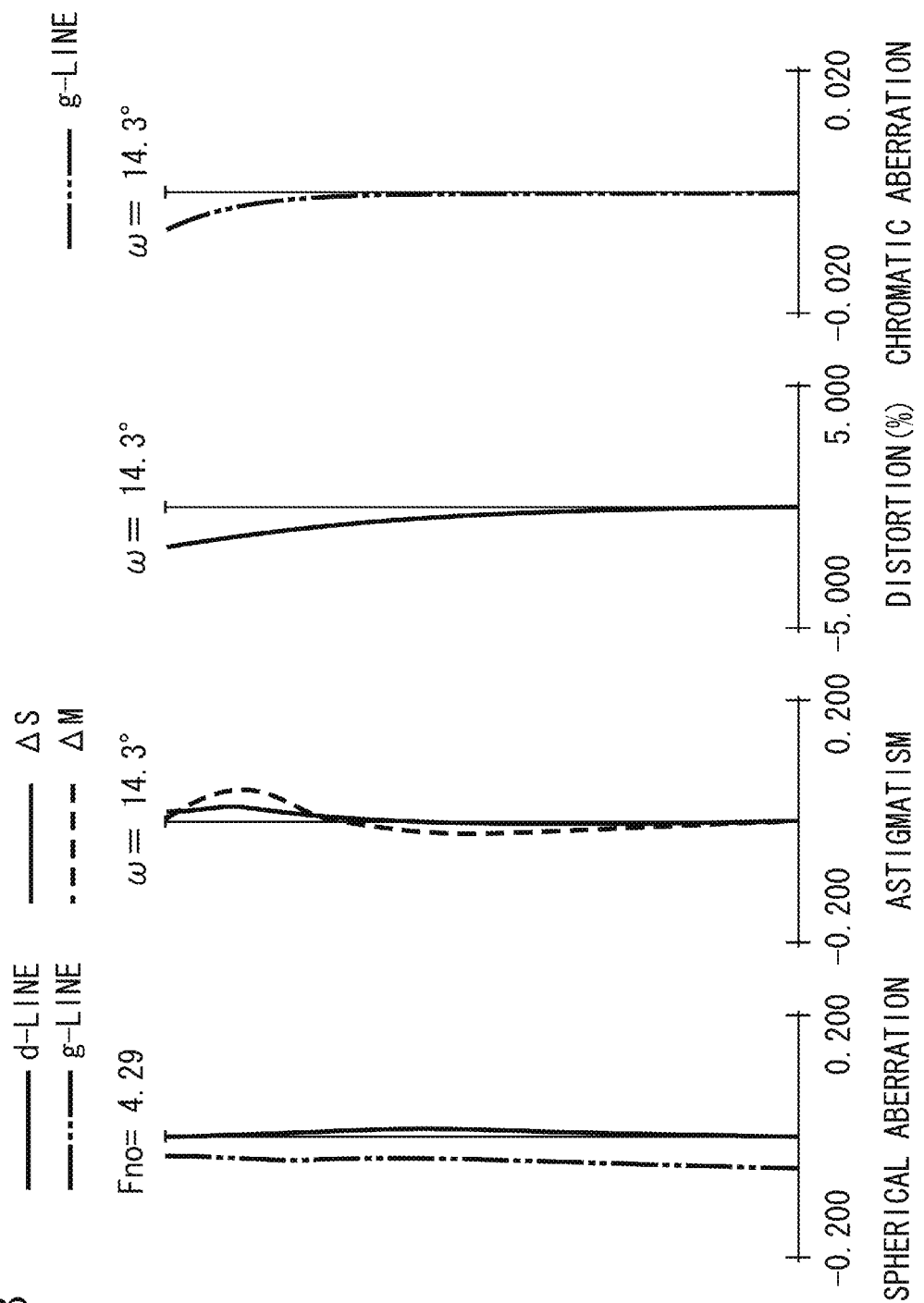
Figure 4C:
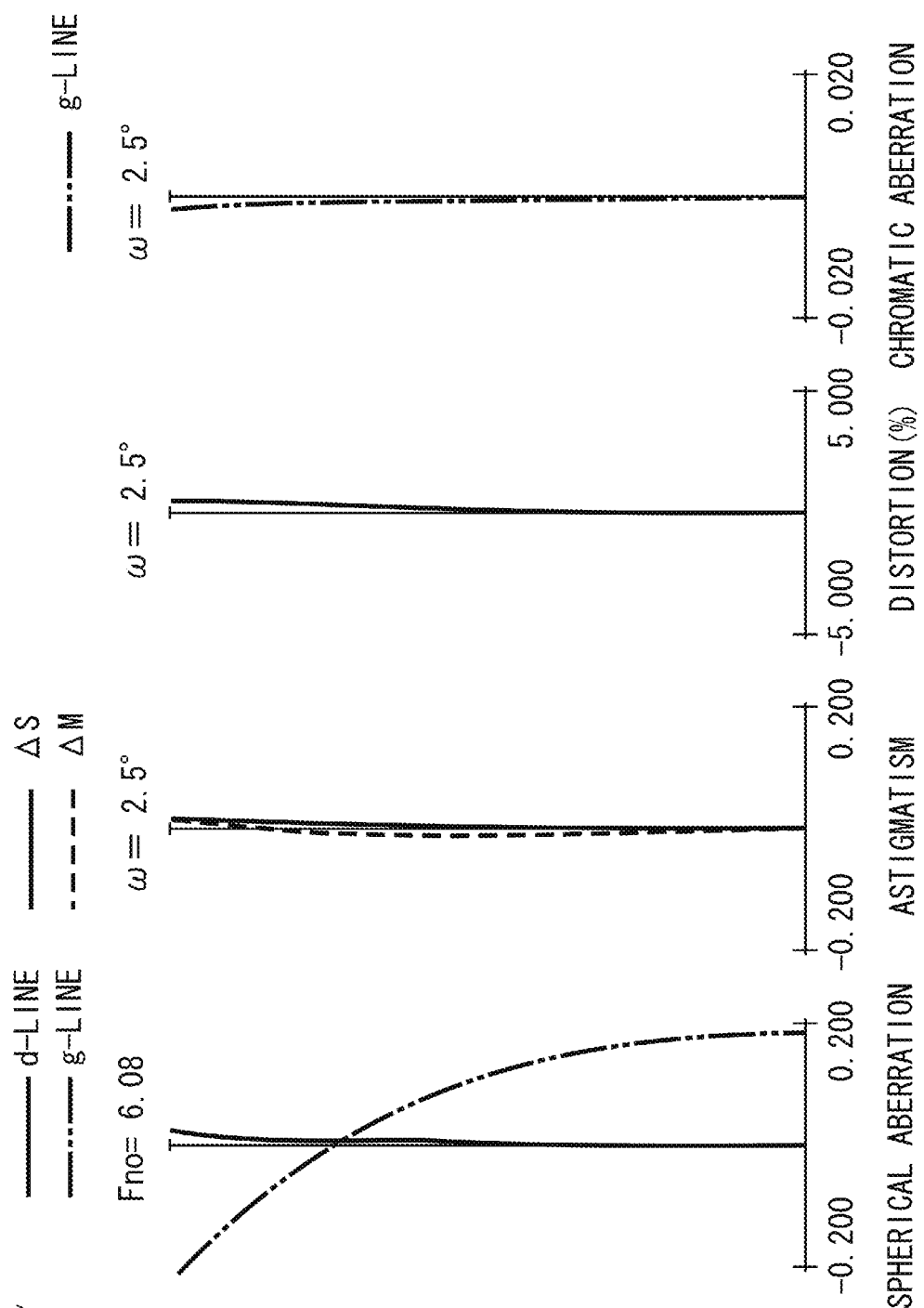

FIG. 1 is a lens cross-sectional view illustrating a zoom lens according to a first exemplary embodiment of the invention at a wide-angle end (short focal length end). FIGS. 2A, 2B, and 2C are aberration diagrams of the zoom lens according to the first exemplary embodiment of the invention at the wide-angle end, the middle zoom position, and the telephoto end (long focal length end), respectively. FIG. 3 is a lens cross-sectional view illustrating a zoom lens according to a second exemplary embodiment of the invention at a wide-angle end. FIGS. 4A, 4B, and 4C are aberration diagrams of the zoom lens according to the second exemplary embodiment of the invention at the wide-angle end, the middle zoom position, and the telephoto end, respectively.

Figure 5:
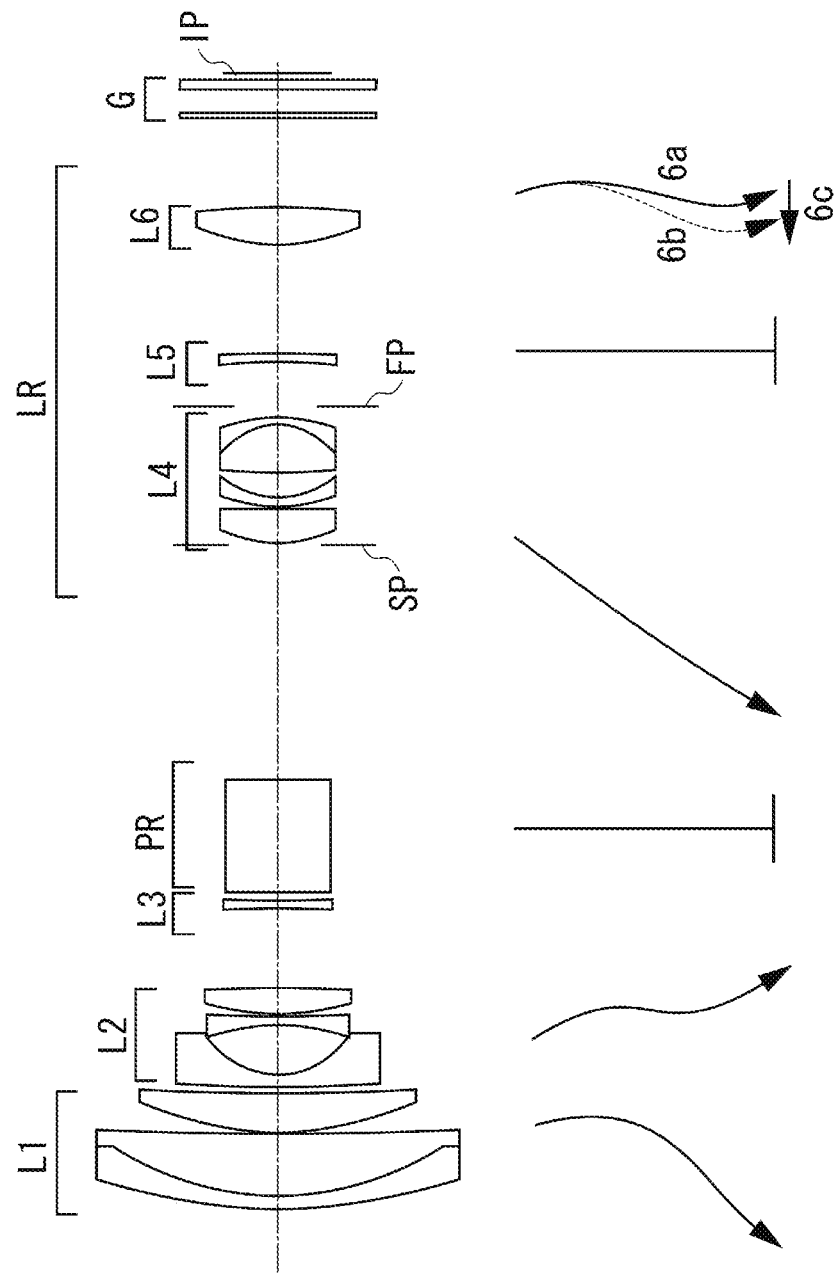
FIG. 5 is a lens cross-sectional view illustrating a zoom lens according to a third exemplary embodiment of the invention at a wide-angle end.
Figure 6A:
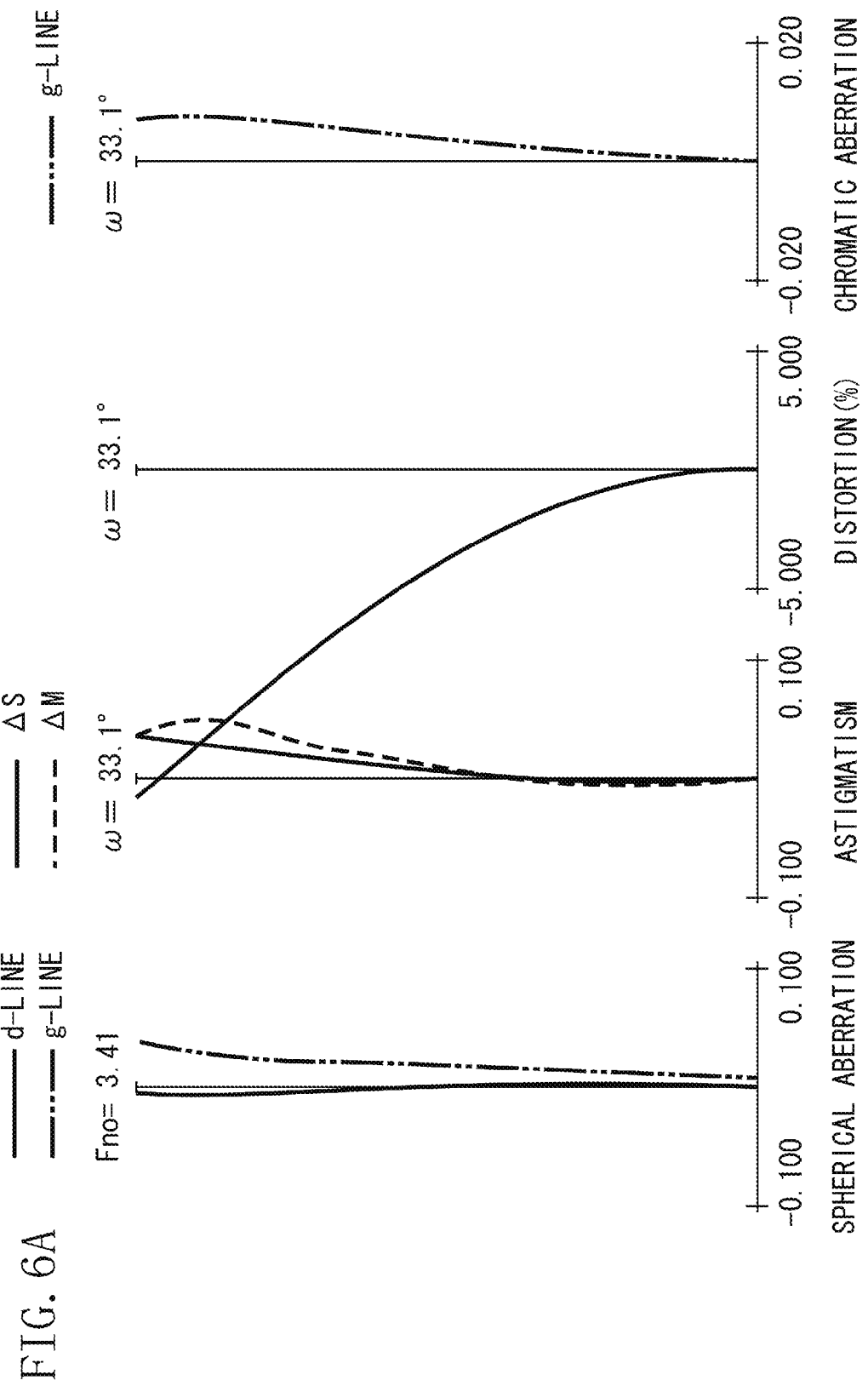
Figure 6B:
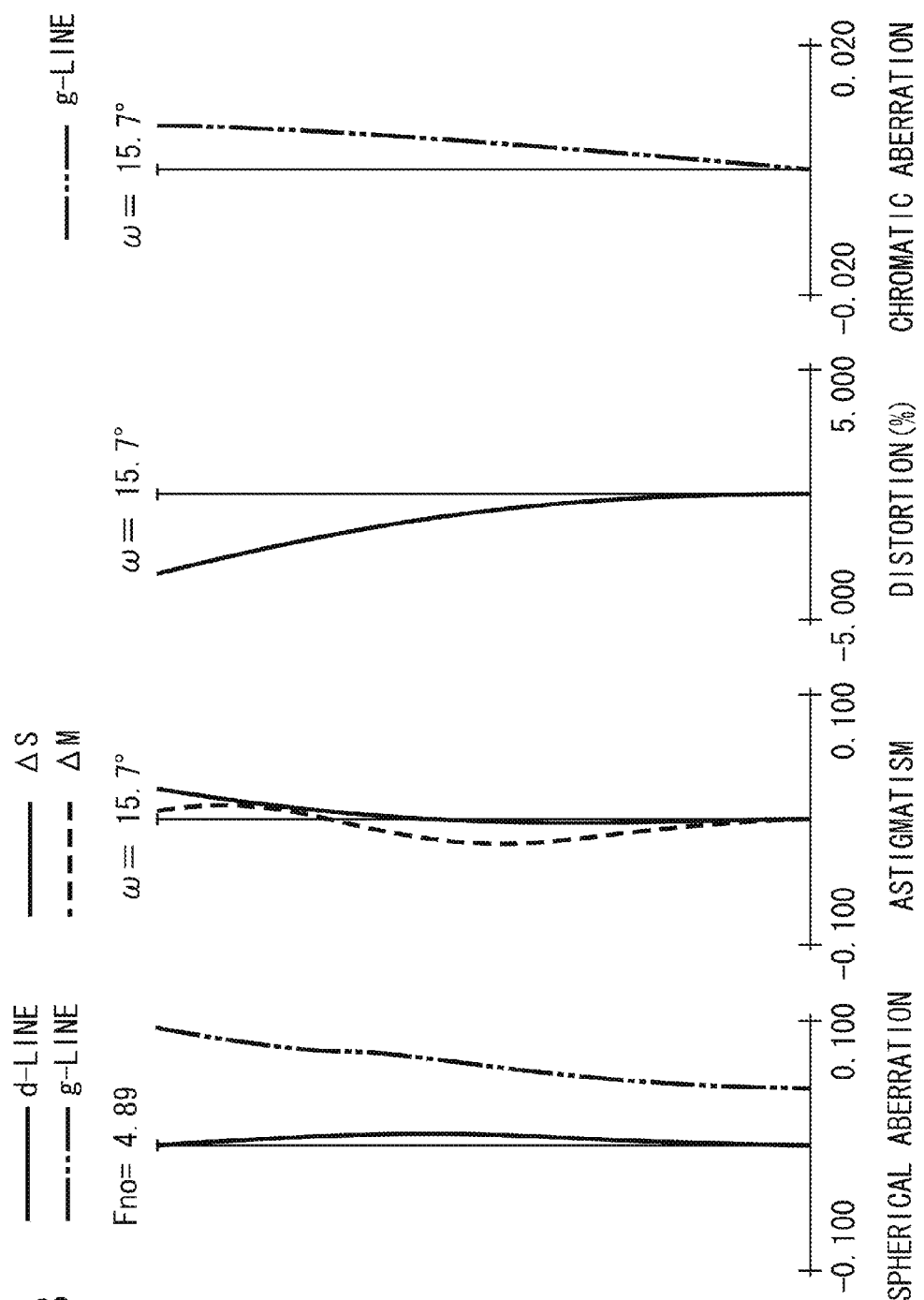

FIG. 5 is a lens cross-sectional view illustrating a zoom lens according to a third exemplary embodiment of the invention at a wide-angle end. FIGS. 6A, 6B, and 6C are aberration diagrams of the zoom lens according to the third exemplary embodiment of the invention at the wide-angle end, the middle zoom position, and the telephoto end, respectively.

Figure 8A:
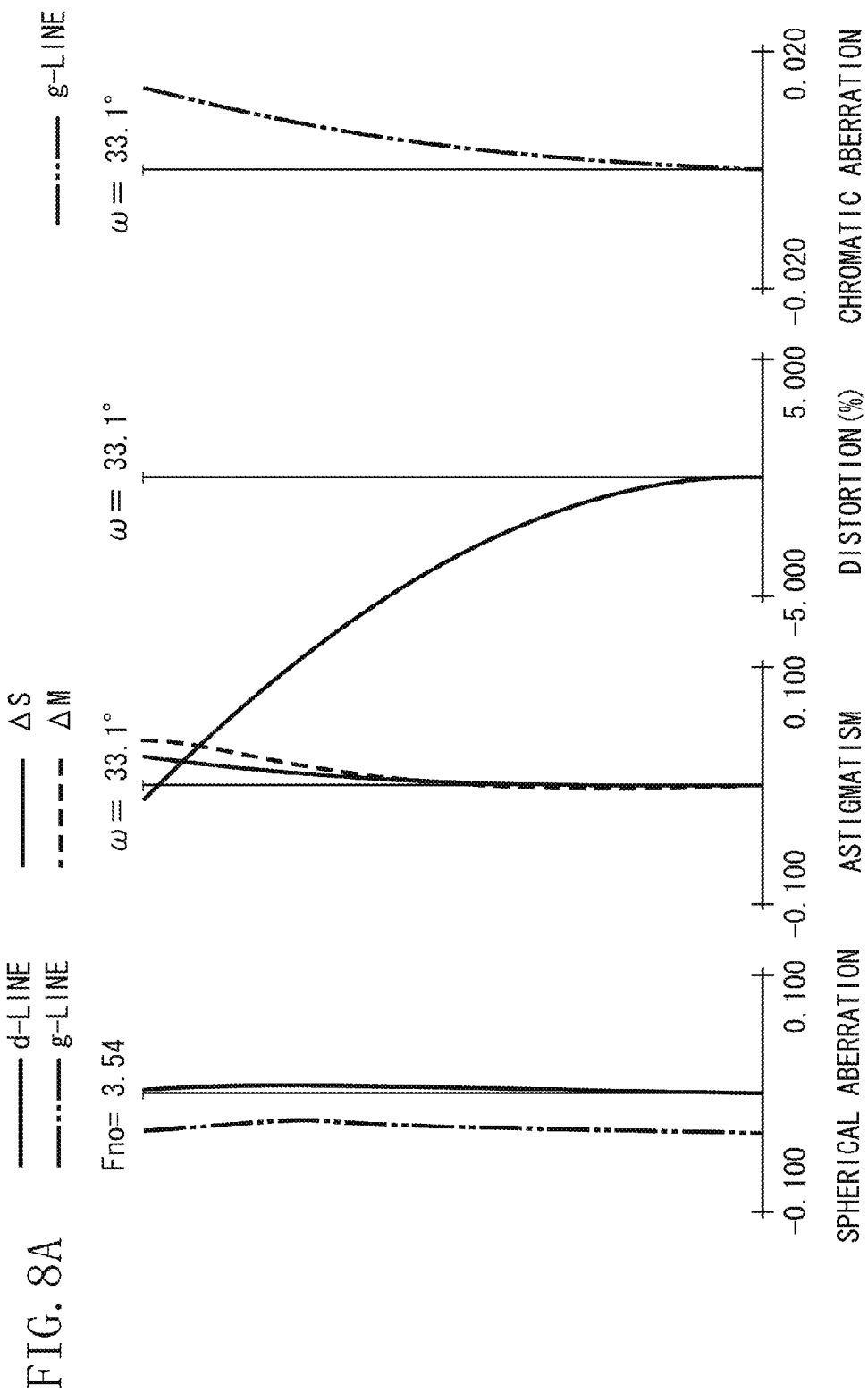
FIGS. 8A, 8B, and 8C are aberration diagrams of the zoom lens according to the fourth exemplary embodiment of the invention at the wide-angle end, the middle zoom position, and the telephoto end, respectively, in Numerical Example 4.
Figure 8B:
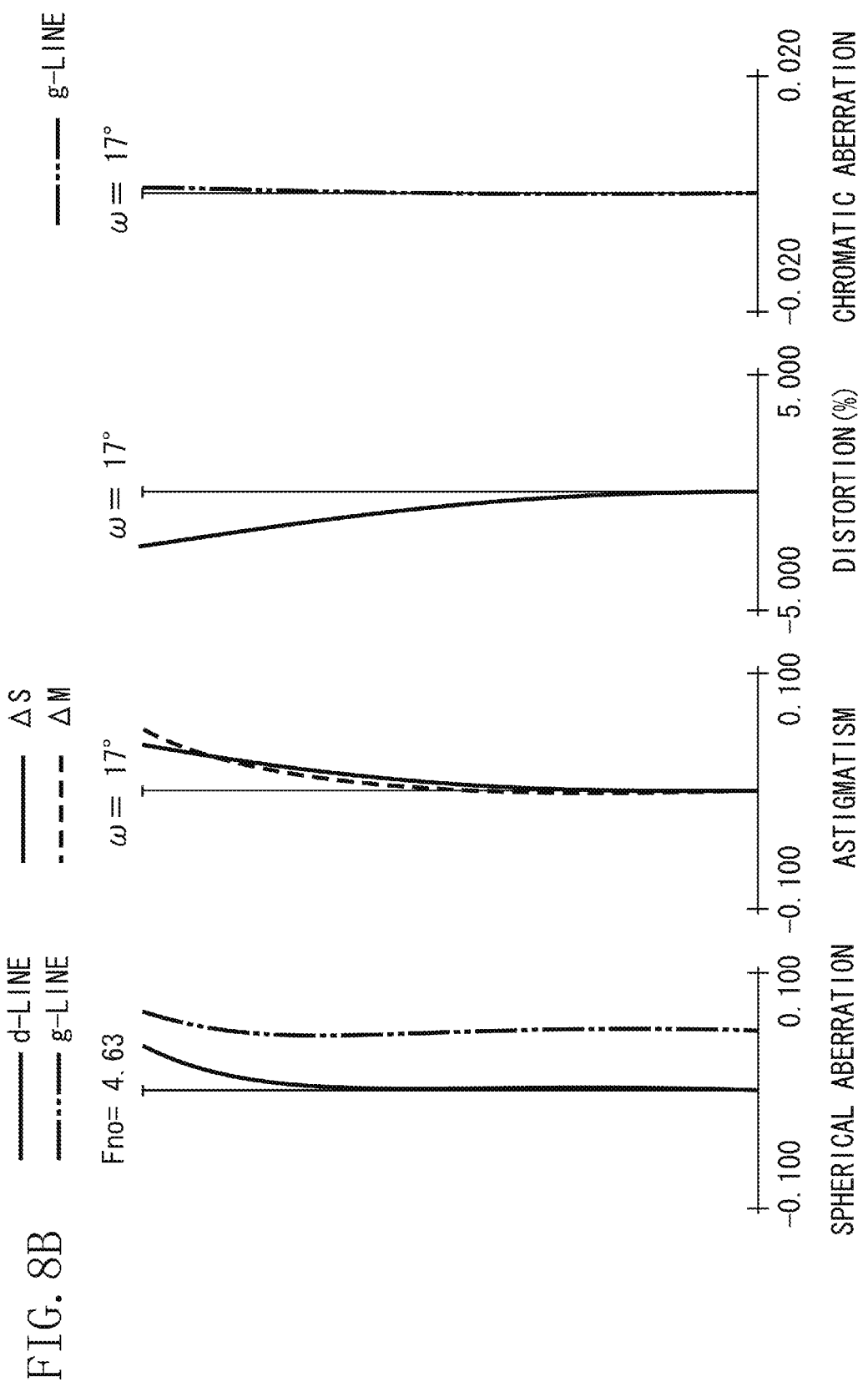
Figure 8C:
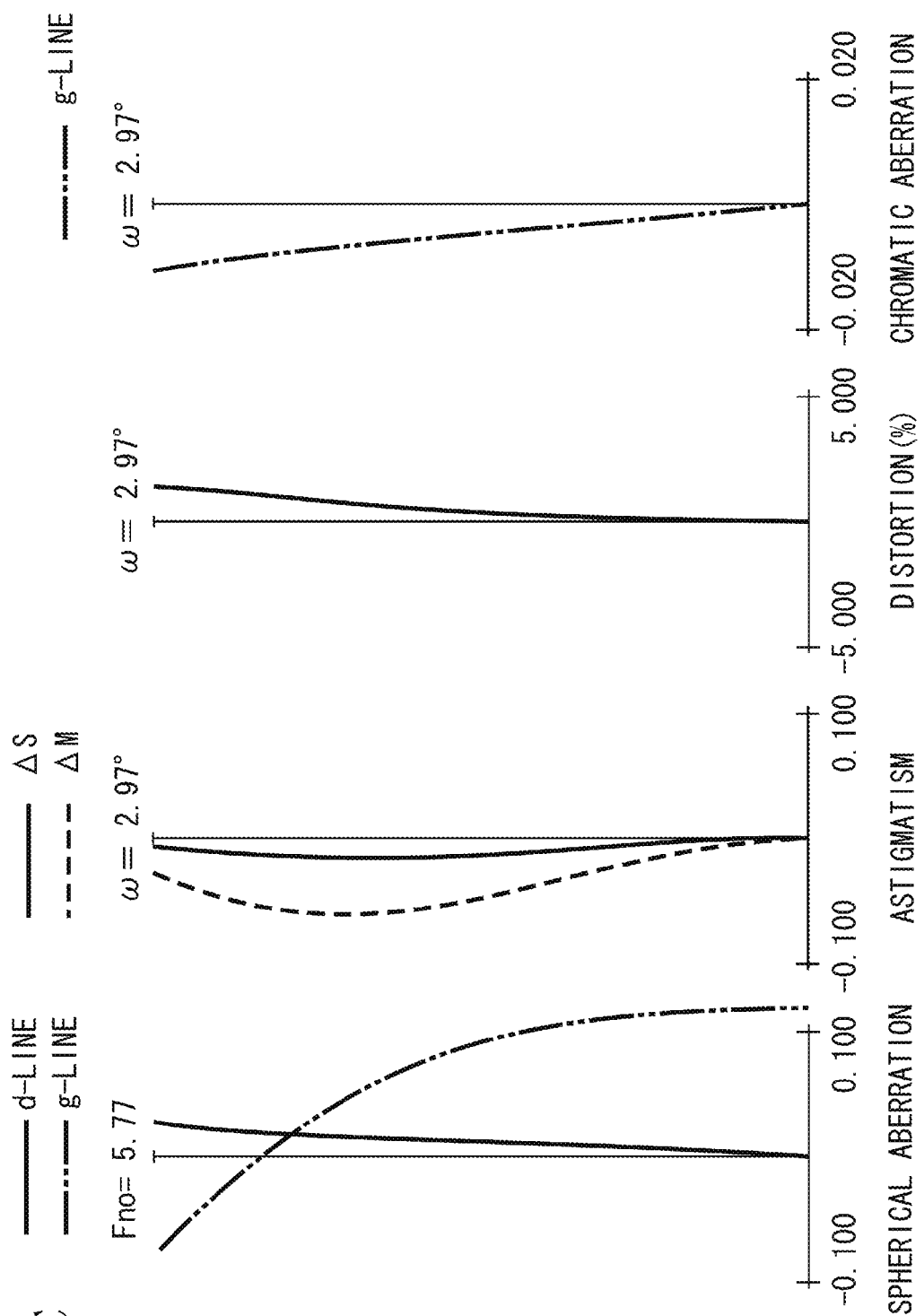

FIG. 7 is a lens cross-sectional view illustrating a zoom lens according to a fourth exemplary embodiment of the invention at a wide-angle end. FIGS. 8A, 8B, and 8C are aberration diagrams of the zoom lens according to the fourth exemplary embodiment of the invention at the wide-angle end, the middle zoom position, and the telephoto end, respectively.

Figure 9:
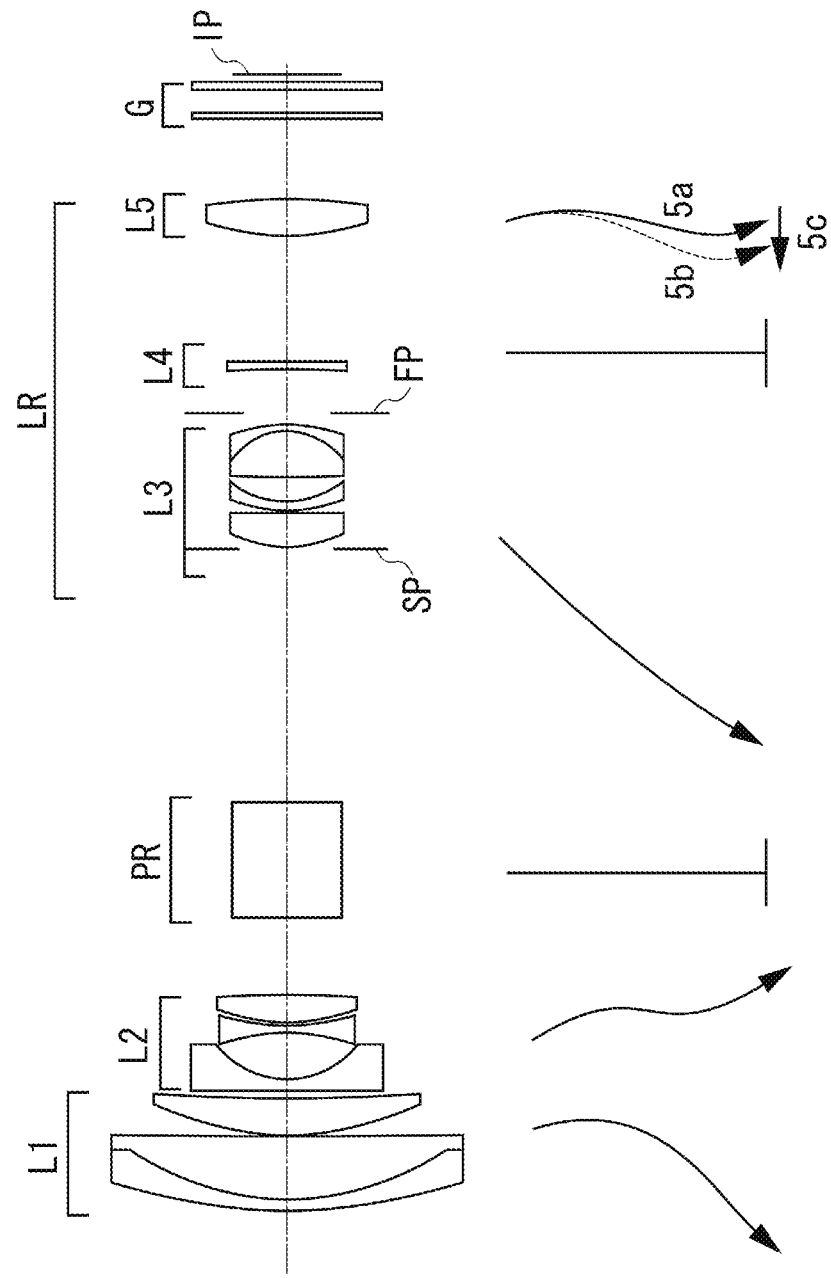
FIG. 9 is a lens cross-sectional view illustrating a zoom lens according to a fifth exemplary embodiment of the invention at a wide-angle end.
Figure 10A:
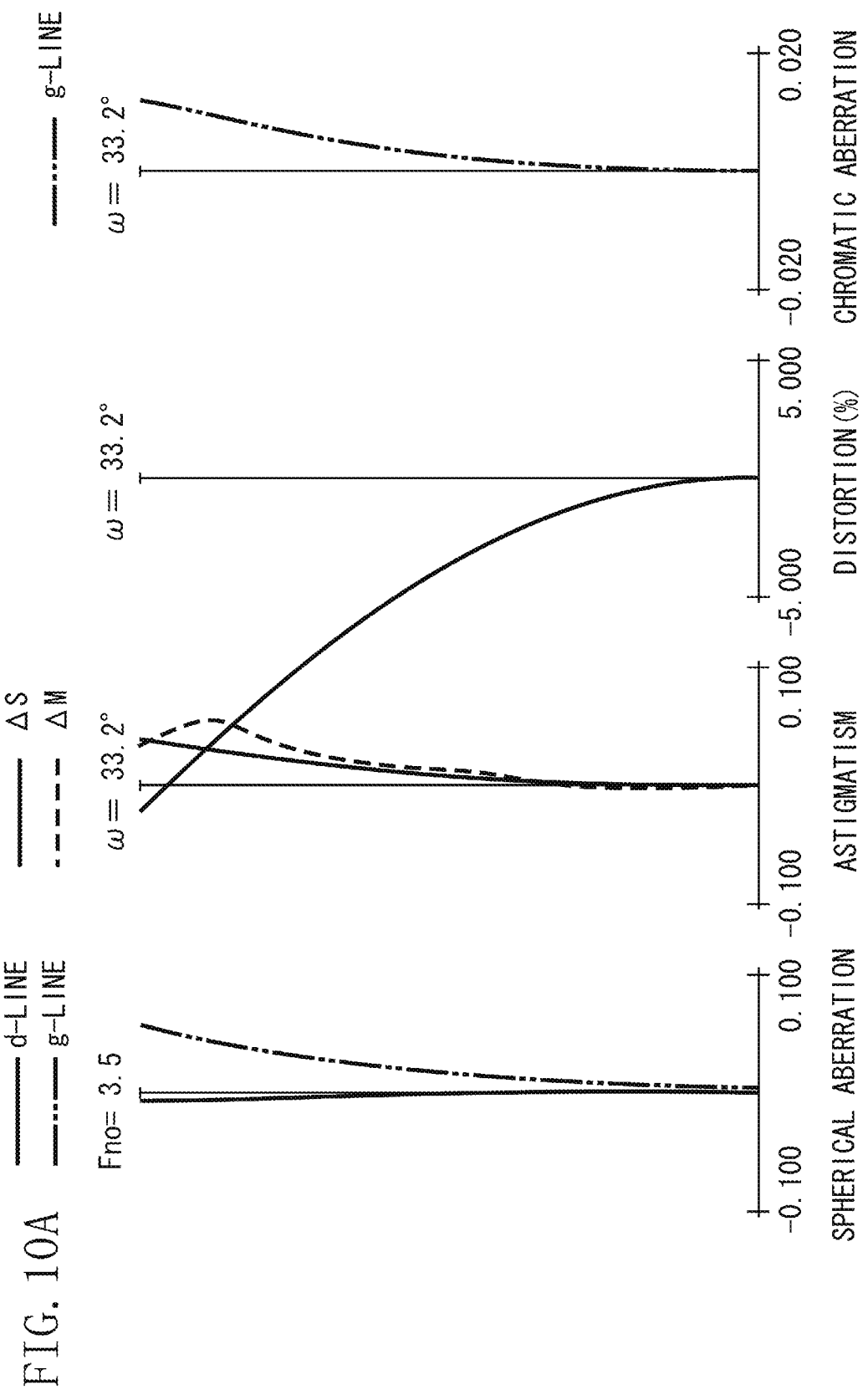

FIG. 9 is a lens cross-sectional view illustrating a zoom lens according to a fifth exemplary embodiment of the invention at a wide-angle end. FIGS. 10A, 10B, and 10C are aberration diagrams of the zoom lens according to the fifth exemplary embodiment of the invention at the wide-angle end, the middle zoom position, and the telephoto end, respectively.

Figure 12A:
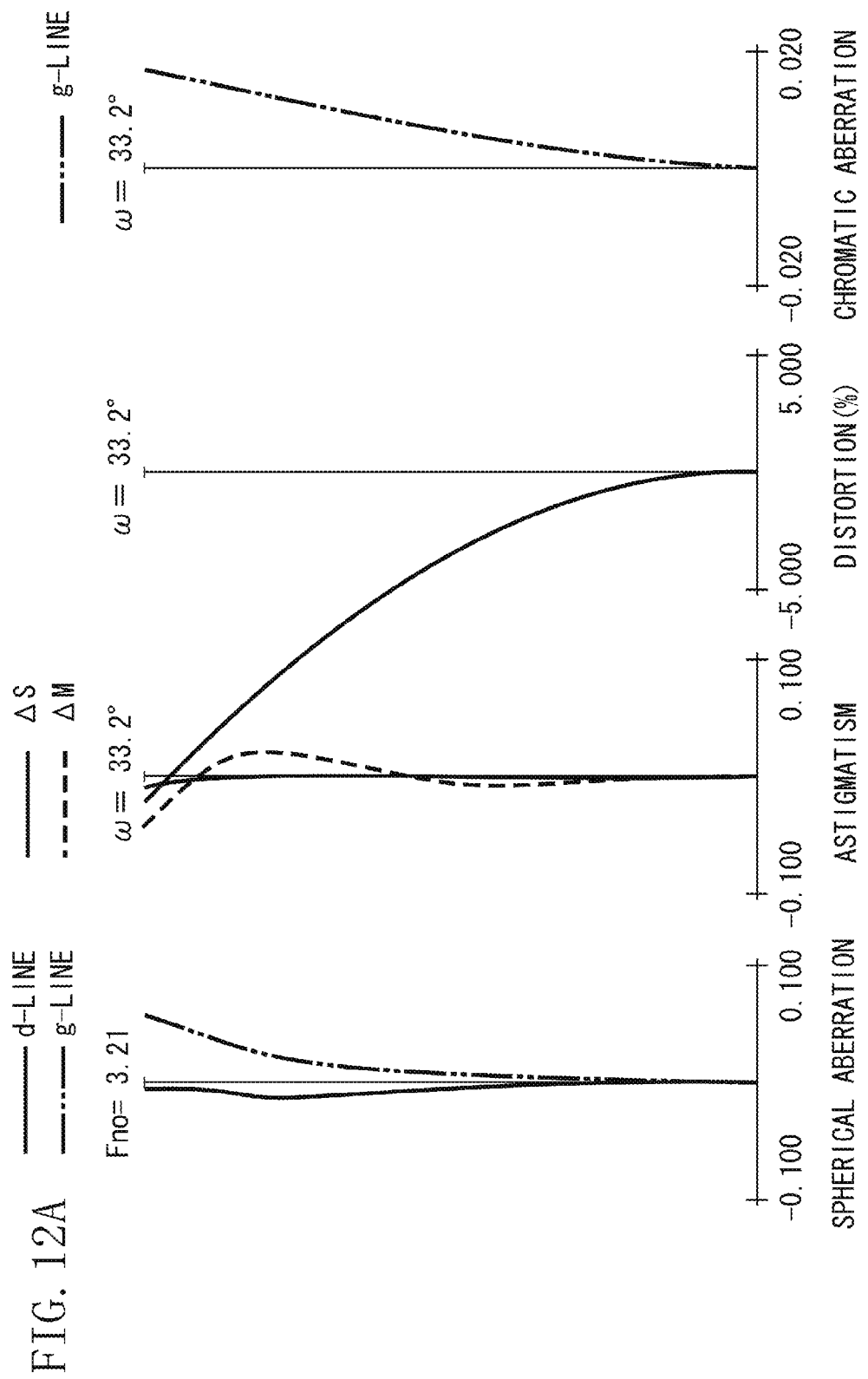
FIGS. 12A, 12B, and 12C are aberration diagrams of the zoom lens according to the sixth exemplary embodiment of the invention at the wide-angle end, the middle zoom position, and the telephoto end, respectively, in Numerical Example 6.
Figure 12B:
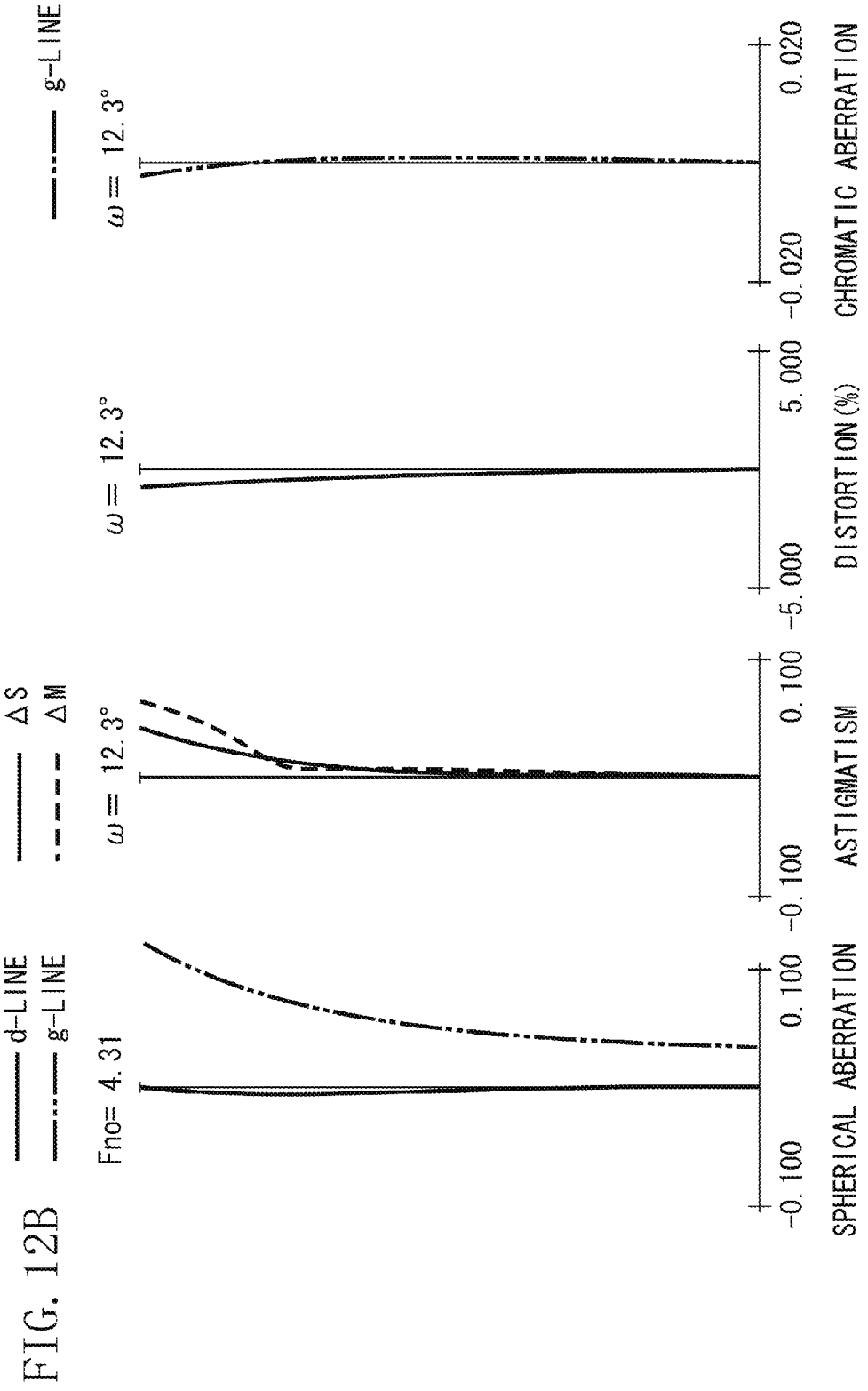
Figure 12C:
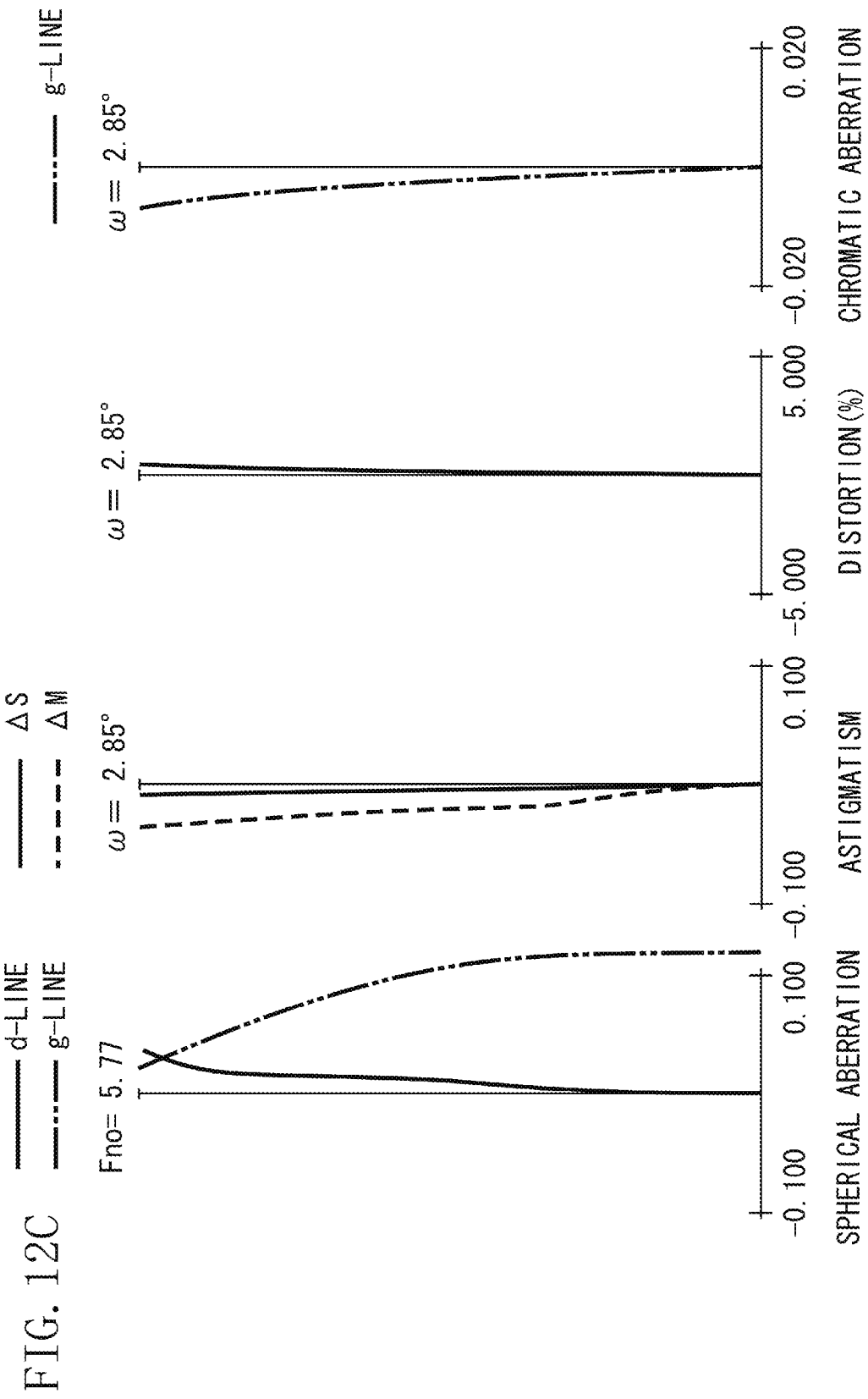

FIG. 11 is a lens cross-sectional view illustrating a zoom lens according to a sixth exemplary embodiment of the invention at a wide-angle end. FIGS. 12A, 12B, and 12C are aberration diagrams of the zoom lens according to the sixth exemplary embodiment of the invention at the wide-angle end, the middle zoom position, and the telephoto end, respectively.

In the lens cross-sectional views of each exemplary embodiment, an optical axis is bent by the internal reflective surface provided in a prism. However, in each lens cross-sectional view, the optical path is illustrated in an exploded state for brevity purposes.

Figure 13:
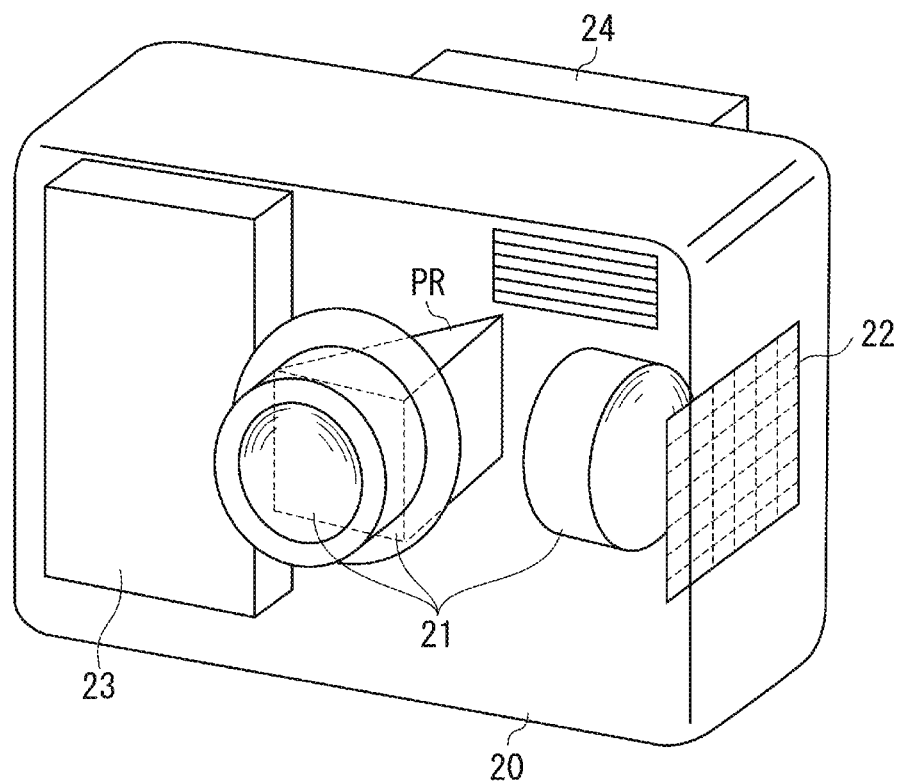
FIG. 13 is a schematic diagram illustrating main parts of an image pickup apparatus according to an exemplary embodiment of the invention.

FIG. 13 is a schematic diagram illustrating main parts of an image pickup apparatus according to an exemplary embodiment of the invention. FIG. 14 is a lens cross-sectional view illustrating a zoom lens according to the first exemplary embodiment of the invention, in which an optical axis is bent by the internal reflective surface provided in the reflective unit (prism).

The zoom lens of each exemplary embodiment is a photographic lens system used in an image pickup apparatus such as a video camera, a digital camera, and a silver-halide film camera. In the lens cross-sectional views, the left side refers to an object side (object side), and the right side refers to an image side (rear side). In the lens cross-sectional views, i denotes the order of a lens unit from the object side, and Li denotes the i-th lens unit.

LR denotes a rear lens group including a plurality of lens units. SP denotes an aperture stop for restricting an F-number light flux, and FP denotes a flare cut stop for cutting off undesired light. PR denotes a reflective unit configured to bend an optical axis, which has an internal reflective surface in the present exemplary embodiment and includes a prism capable of bending the optical axis by about 90°. G denotes an optical block including an optical filter, a phase plate, a crystal low-pass filter, an infrared cut-off filter, and the like.

IP denotes an image plane, which corresponds to an imaging surface of a solid-state image sensor (photoelectric conversion element) such as a CCD sensor or a CMOS sensor when the zoom lens is used in the photographic optical system of a video camera or a digital camera, or corresponds to a photosensitive surface of a film surface when the zoom lens is used in a silver-halide film camera. In the spherical aberration diagrams, the solid line and the two-dotted dashed line denote the Fraunhofer's d-line and the Fraunhofer's g-line, respectively. In astigmatism diagrams, the dotted line ΔM and the solid line ΔS denote a meridional image plane and a sagittal image plane, respectively. Chromatic aberration of magnification is indicated by the g-line. ω denotes a half angle of view (degree), which is a half of the imaging angle of view, and Fno denotes an F-number.

In each exemplary embodiment described below, the wide-angle end and the telephoto end refer to zoom positions when the zoom lens unit is positioned in respective ends within the movable range on an optical axis of a mechanism.

The zoom lens of each exemplary embodiment includes a first lens unit L1 of a positive refractive power and a second lens unit L2 of a negative refractive power in order from an object side to an image side. During zooming from the wide-angle end to the telephoto end, the first lens unit L1 is moved towards the object side relative to an imaging surface, and the second lens unit is moved towards the image side at the telephoto end rather than the wide-angle end.

In each exemplary embodiment, during zooming, at the telephoto end rather than the wide-angle end, the first lens unit L1 is moved to and positioned on the object side, and the second lens unit L2 is moved to and positioned on the image side. As a result, it is possible to obtain a high zoom ratio while the front lens effective diameter is reduced by shortening the entire lens length at the wide-angle end. In each exemplary embodiment, the second lens unit L2 is allowed to have a high variable power effect by moving the first lens unit L1 of a positive refractive power towards the object side, so that it is possible to obtain a high zoom ratio of about 10 to 20 times without significantly increasing the refractive power of the first lens unit L1.

It is desirable that the number of lenses of the first lens unit L1 be small in order to decrease the effective lens diameter of the first lens unit L1. In each exemplary embodiment, the first lens unit L1 includes three lenses, negative, positive, and positive lenses, in order from the object side to the image side.

Specifically, in each exemplary embodiment, the first lens unit L1 includes a cemented lens obtained by cementing a single positive lens and a single negative lens, and a positive lens. As a result, it is possible to appropriately correct spherical aberration and chromatic aberration generated to obtain a high zoom ratio.

In each exemplary embodiment, the second lens unit L2 includes negative, negative, and positive lenses and has at least one aspheric surface.

Specifically, in each exemplary embodiment, any one or both of the surfaces of the lens G4 closest to the object side of the second lens unit L2 have an aspheric shape. As a result, it is possible to appropriately correct chromatic aberration of magnification mostly at the wide-angle end and curvature of field across the entire zoom range.

Since the zoom lens according to each exemplary embodiment includes a reflective unit configured to bend an optical axis (prism), the camera thickness can be reduced by arranging the lens units in a direction parallel to the camera thickness direction. As a result, during zooming, as the movement amounts of the first and second lens units L1 and L2 increase, a telescoping mechanism of the zoom lens barrel becomes complicated, so that it is difficult to obtain holding precision of such lens units. If aggravation of the holding precision is alleviated, the lens unit is eccentric, so that optical performance is degraded. For this reason, in the zoom lens of each exemplary embodiment, the variable power contributions of the front lens unit on the object side and the rear lens group on the image side relative to the reflective unit are optimally set. Specifically, the following conditions are satisfied:

$$4.3 < \beta 2t/\beta 2w < 12.0 \quad (1),$$

and $$2.1 < \beta Rt/\beta Rw < 3.0 \quad (2),$$

where $\beta 2w$ and $\beta 2t$ denote lateral magnifications of the second lens unit L2 at the wide-angle end and the telephoto end, respectively, and $\beta Rw$ and $\beta Rt$ denote lateral magnifications of a lens unit having the greatest variable power contribution in the rear lens group LR at the wide-angle end and the telephoto end, respectively.

In each exemplary embodiment, the lens unit having the greatest variable power contribution out of the rear lens group LR is set as follows. In the first exemplary embodiment, the fourth lens unit is set as the lens unit having the greatest variable power contribution. In the second exemplary embodiment, the fourth lens unit is set. In the third exemplary embodiment, the fourth lens unit is set. In the fourth exemplary embodiment, the third lens unit is set. In the fifth exemplary embodiment, the third lens unit is set. In the sixth exemplary embodiment, the fourth lens unit is set.

The condition (1) is to set a variable power effect of the second lens unit L2. The condition (2) is to appropriately set a variable power effect of the lens unit having the greatest variable power contribution out of the rear lens group LR on the image side relative to the reflective unit PR.

If the variable power effect of the second lens unit L2 decreases with the lower limit of the condition (1) exceeded, it is difficult to allow the zoom lens to obtain a desired zoom ratio (12 to 20 times). In addition, since a variable power contribution of the rear lens group LR on the image side relative to the reflective unit PR increases, the lateral optical path length of the camera increases, and the size of the camera increases. In addition, since the refractive power of the rear lens group LR increases, it is difficult to correct coma across the entire zoom range. In addition, when image stabilization is performed using the rear lens group LR, it is difficult to correct coma during the image stabilization.

If the variable power effect of the second lens unit L2 increases with the upper limit of the condition (1) exceeded, the movement amount m2 during zooming of the second lens unit L2 increases, and the structure of the zoom lens barrel becomes complicated. As a result, optical performance is degraded as described above.

In addition, as the focal length f2 of the second lens unit L2 decreases, it is difficult to correct curvature of field or chromatic aberration of magnification, mostly, at the wide-angle end. In addition, it is difficult to suppress a variation of the image plane around a periphery thereof across the entire zoom range. Since the refractive power of the second lens unit L2 mostly contributing to the variable magnification increases, a slope or parallel decentering sensitivity of each lens unit increases. Therefore, it is difficult to obtain excellent optical performance due to decentering generated by play in a mechanical part when the camera is assembled or used in a normal case.

If the variable power effect of the lens unit having the greatest variable power contribution out of the rear lens group LR on the image side relative to the reflective unit decreases with the lower limit of the condition (2) exceeded, it is difficult to obtain a desired zoom ratio (12 to 20 times), and the variable power effect of the second lens unit L2 increases. As a result, the movement amount m2 of the second lens unit L2 increases, or the focal length f2 decreases, so that the optical performance is degraded as described above.

If the variable power effect of the lens unit having the greatest variable power contribution out of the rear lens group LR on the image side relative to the reflective unit increases with the upper limit of the condition (2) exceeded, the lateral optical path length of the camera increases, so that the size of the camera increases. In addition, since the refractive power of the rear lens group LR increases, it is difficult to correct coma across the entire zoom range or coma during image stabilization.

As described above, in each exemplary embodiment, a variable power contribution of the lens unit having the greatest variable power contribution out of the rear lens group LR and the second lens unit L2 at the wide-angle end and the telephoto end is appropriately set to satisfy the conditions (1) and (2). As a result, it is possible to obtain a small size and a thin thickness of the entire zoom lens with a high zoom ratio and excellent optical performance across the entire zoom range.

More usefully, the numerical ranges of the conditions (1) and (2) are set as follows:

$$4.5 < \beta 2t/\beta 2w < 8.0 \quad (1a)$$

$$2.15 < \beta Rt/\beta Rw < 2.80 \quad (2a)$$

If the numerical ranges of the conditions (1) and (2) are set in this manner, it is possible to obtain a miniaturized zoom lens having excellent optical performance across the entire zoom range with a wide angle of view and a high zoom ratio. In each exemplary embodiment, it is more desirable that at least one of the following conditions be satisfied:

$$0.15 < |m1 - m2|/ft < 0.35 \quad (3),$$

$$2.7 < |mR|/fw < 4.5 \quad (4),$$

$$0.060 < |f2|/ft < 0.130 \quad (5),$$

$$0.15 < |fR|/ft < 0.30 \quad (6),$$

and $$0.85 < |mR/fR| < 1.50 \quad (7),$$

where m1 denotes a movement amount of the first lens unit L1 relative to the image plane during zooming from the wide-angle end to the telephoto end, m2 denotes a movement amount of the second lens unit L2 relative to the image plane during zooming from the wide-angle end to the telephoto end, and mR denotes a movement amount of the lens unit having the greatest variable power contribution out of the rear lens group LR relative to the image plane during zooming from the wide-angle end to the telephoto end. Here, the movement amount of the lens unit during zooming from the wide-angle end to the telephoto end refers to a difference between the position of the lens unit at the wide-angle end and the position of the lens unit at the telephoto end. In addition, fw and ft denote focal lengths of the entire zoom lens at the wide-angle end and the telephoto end, respectively, f2 denotes a focal length of the second lens unit L2, and fR denotes a focal length of the lens unit having the greatest variable power contribution out of the rear lens group LR.

The condition (3) is to appropriately set a relation between the movement amounts m1 and m2 of the first and second lens units L1 and L2 during zooming and the focal length ft of the entire zoom lens at the telephoto end for obtaining a high zoom ratio while the entire zoom lens is miniaturized.

If, with the lower limit of the condition (3) exceeded, the difference between the movement amounts m1 and m2 of the first and second lens units L1 and L2, respectively, decreases relative to the focal length ft of the entire zoom lens, the focal lengths of the first and second lens units L1 and L2 decrease. As a result, it is difficult to correct curvature of field and chromatic aberration of magnification at the wide-angle end. Furthermore, it is difficult to suppress a variation of curvature of field around the periphery of an image plane across the entire zoom range. Moreover, it is difficult to correct aspheric aberration and axial chromatic aberration at the telephoto end.

If, with the upper limit of the condition (3) exceeded, the difference between the movement amounts m1 and m2 of the first and second lens units L1 and L2, respectively, increases relative to the focal length ft of the entire zoom lens, a telescoping mechanism of the zoom lens barrel becomes complicated. As a result, the holding precision of the lens unit is deteriorated, so that the optical performance is degraded. In addition, the camera thickness increases, so that the size of the camera increases.

The condition (4) is to obtain a high zoom ratio while the entire zoom lens is miniaturized. The condition (4) is to appropriately set a ratio between the movement amount mR caused by the zooming of the lens unit having the greatest variable power contribution out of the rear lens group LR on the image side relative to the reflective unit PR and the focal length fw of the entire zoom lens at the wide-angle end.

If, with the lower limit of the condition (4) exceeded, the movement amount mR of the lens unit having the greatest variable power contribution decreases relative to the focal length fw of the entire zoom lens at the wide-angle end, the variable power contribution of the rear lens group LR decreases. As a result, the variable power contributions of the first and second lens units L1 and L2 increase, so that optical performance is degraded, and the size of the camera increases.

If, with the upper limit of the condition (4) exceeded, the movement amount mR of the lens unit having the greatest variable power contribution out of the rear lens group LR increases relative to the focal length fw of the entire zoom lens at the wide-angle end, the size of the camera increases in a lateral direction. In addition, a variation of the F-number Fno from the wide-angle end to the telephoto end increases, which is not desirable.

The condition (5) is to appropriately set a ratio between the focal length f2 of the second lens unit L2 and the focal length ft of the entire zoom lens at the telephoto end to miniaturize the entire zoom lens with a high zoom ratio.

If, with the lower limit of the condition (5) exceeded, the focal length f2 of the second lens unit L2 decreases relative to the focal length ft of the entire zoom lens, it is difficult to correct curvature of field and chromatic aberration of magnification, mostly, at the wide-angle end. In addition, it is difficult to suppress a variation of curvature of field around the periphery of an image plane across the entire zoom lens. Furthermore, since the refractive power of the second lens unit L2 mostly contributing to the variable power increases, the slope or parallel decentering sensitivity of each lens unit increases. As a result, it is difficult to obtain excellent optical performance due to decentering caused by play in a mechanical part when the camera is assembled and used in a normal case.

If, with the upper limit of the condition (5) exceeded, the focal length f2 of the second lens unit L2 increases relative to the focal length ft of the entire zoom lens, it is necessary to increase the movement amount of the second lens unit L2 during zooming to obtain a high zoom ratio. For this reason, optical performance is degraded, and the size of the camera increases. In addition, the effective diameters of the first and second lens units increase.

The condition (6) is to appropriately set a ratio between the focal length fR of the lens unit having the greatest variable power contribution out of the rear lens group LR on the image side relative to the reflective unit PR and the focal length ft of the entire zoom lens at the telephoto end in order to obtain a high zoom ratio while the entire zoom lens is miniaturized.

If, with the lower limit of the condition (6) exceeded, the focal length fR of the lens unit having the greatest variable power contribution out of the rear lens group LR decreases relative to the focal length ft of the entire zoom lens at the telephoto end, it is difficult to correct coma across the entire zoom range. In addition, when image stabilization is performed using the lens unit having the focal length fR, it is difficult to correct coma during image stabilization.

If, with the upper limit of the condition (6) exceeded, the focal length fR of the lens unit having the greatest variable power contribution out of the rear lens group LR increases relative to the focal length ft of the entire zoom lens at the telephoto end, the movement amount of the lens unit having the focal length fR increases to obtain a desired zoom ratio. For this reason, the size of the camera increases. In addition, since the variable power contributions of the first lens unit L1 and the second lens unit increase, optical performance is degraded.

The condition (7) is to appropriately set a ratio between the movement amount mR of the lens unit having the greatest variable power contribution out of the rear lens group LR and the focal length fR. If, with the lower limit of the condition (7) exceeded, the movement amount mR of the lens unit having the greatest variable power contribution out of the rear lens group decreases, or the focal length fR increases, the variable power contribution of this lens unit decreases. As a result, since the variable power contributions of the first and second lens units L1 and L2 increase, optical performance is degraded.

If, with the upper limit of the condition (7) exceeded, the movement amount mR of the lens unit having the greatest variable power contribution out of the rear lens group increases relative to that of the reflective unit, the size of the camera increases in a lateral direction. In addition, if the focal length fR decreases, it is difficult to correct coma across the entire zoom range, so that optical performance is degraded.

In each exemplary embodiment, in order to increase the zoom ratio and miniaturize the entire lens system while a variation of aberration during aberration correction and zooming is reduced, it is desirable that the numerical ranges of the conditions (3) to (7) be set as follows:

$$0.18 < |m1 - m2|/ft < 0.31 \quad (3a)$$

$$2.72 < |mR|/fw < 3.70 \quad (4a)$$

$$0.070 < |f2|/ft < 0.125 \quad (5a)$$

$$0.18 < |fR|/ft < 0.28 \quad (6a)$$

$$0.90 < |mR|/fR < 1.20 \quad (7a)$$

As described above, in each exemplary embodiment, it is possible to obtain a zoom lens capable of obtaining excellent optical performance across the entire zoom range with a high zoom ratio of 12 to 20 times while the size and the thickness of the entire zoom lens are reduced.

Next, a configuration of the zoom lens according to each exemplary embodiment of the invention will be described. In the lens cross-sectional views of the first and second exemplary embodiments, L1 denotes a first lens unit of a positive refractive power, L2 denotes a second lens unit of a negative refractive power, L3 denotes a third lens unit of a negative refractive power, L4 denotes a fourth lens unit of a positive refractive power, L5 denotes a fifth lens unit of a negative refractive power, and L6 denotes a sixth lens unit of a positive refractive power. The first and second exemplary embodiments relate to a six-unit zoom lens.

The reflective unit (prism) PR is arranged between the second and third lens units L2 and L3. An aperture stop SP is arranged inside the fourth lens unit L4. A flare cut stop FP is arranged on the image side of the fourth lens unit L4.

In the first and second exemplary embodiments, during zooming from the wide-angle end to the telephoto end, the first, second, fourth, and sixth lens units L1, L2, L4, and L6 are moved as indicated by the arrows. Specifically, during zooming from the wide-angle end to the telephoto end, the first lens unit L1 is moved towards the object side, the second lens unit L2 is moved towards the image side, and the fourth lens unit L4 is moved towards the object side as indicated by the arrows. The sixth lens unit L6 is moved towards the image side, towards the object side, and then, towards the image side along a locus having two inflection points.

The aperture stop SP and the flare cut stop FP are moved in synchronization with the fourth lens unit L4 during zooming. The prism PR, the third lens unit L3, and the fifth lens unit L5 are stationary. However, the third and fifth lens units L3 and L5 may be moved independently from the other lens units as necessary. In addition, in the first and second exemplary embodiments of the invention, a rear focus type zoom lens, in which focusing is performed by moving the sixth lens unit L6 along an optical axis, is employed.

Focusing from an infinitely-distant object to a close object at the telephoto end is performed by moving the sixth lens unit L6 forward (towards the front side) as indicated by the arrow 6c. The solid line curve 6a and the dotted line curve 6b for the sixth lens unit L6 represent movement loci for correcting a variation of the image plane caused by the zooming from the wide-angle end to the telephoto end when the focusing is performed for the infinitely-distant object and the close object, respectively.

In addition, focusing may be performed using the fifth lens unit L5 of a negative refractive power. In this case, focusing is performed by moving the fifth lens unit L5 rearward (towards the rear side). An image can be displaced in a direction perpendicular to the optical axis by moving the entire fourth lens unit L4 of a positive refractive power or a part thereof to have a component perpendicular to the optical axis. As a result, a shake of a photographed image generated when the entire zoom lens is vibrated (tilted) is corrected. Thus, image stabilization is performed. In addition, in order to correct a shake of a photographed image, the fifth lens unit L5 of a negative refractive power may be moved to have a component perpendicular to the optical axis.

According to the first and second exemplary embodiments of the invention, image stabilization is performed without adding an optical member such as a variable angle prism or a lens unit for image stabilization. As a result, it is possible to prevent the size of the entire zoom lens from increasing.

Although image stabilization is performed by moving the entire lens unit or a part thereof to a direction perpendicular to the optical axis in each exemplary embodiment, an image shake can be corrected when the entire lens unit or a part thereof is moved to have a component perpendicular to the optical axis. For example, if the lens barrel is allowed to have a complicated structure, image stabilization may be performed by rotating the entire lens unit or a part thereof such that the rotation center is positioned on the optical axis.

The fourth lens unit L4 includes a positive lens, a negative lens, and a cemented lens obtained by cementing positive and negative lenses, so that decentering aberration during image stabilization is reduced. An aspheric surface is used in the fourth lens unit L4. As a result, it is possible to appropriately correct a variation of spherical aberration caused by the zooming. Since each of the third, fifth, and sixth lens units L3, L5, and L6 is made of a single lens, it is possible to obtain a small size and a light weight in each lens unit.

The third exemplary embodiment relates to a six-unit zoom lens having the same refractive power arrangement as that of the first or second exemplary embodiment. The third exemplary embodiment is different from the first or second exemplary embodiment in that the reflective unit (prism) PR is arranged between the third and fourth lens units L3 and L4, and the aperture stop SP is arranged on the object side of the fourth lens unit L4. Other configurations are similar to those of the first or second exemplary embodiment.

In the lens cross-sectional view of the fourth exemplary embodiment, L1 denotes a first lens unit of a positive refractive power, L2 denotes a second lens unit of a negative refractive power, L3 denotes a third lens unit of a positive refractive power, and L4 denotes a fourth lens unit of a positive refractive power. The fourth exemplary embodiment relates to a four-unit zoom lens. The reflective unit (prism) PR is arranged between the second and third lens units L2 and L3. The aperture stop SP is arranged inside the third lens unit L3. The flare cut stop FP is arranged on the image side of the third lens unit L3.

In the fourth exemplary embodiment, during zooming from the wide-angle end to the telephoto end, the first, second, third, and fourth lens units L1, L2, L3, and L4 are moved as indicated by the arrows.

Specifically, during zooming from the wide-angle end to the telephoto end, the first lens unit L1 is moved towards the object side, the second lens unit L2 is moved towards the image side, and the third lens unit L3 is moved towards the object side as indicated by the arrows. The fourth lens unit L4 is moved along a locus that is convex towards the object side. The aperture stop SP and the flare cut stop FP are moved in synchronization with the fourth lens unit L4 during zooming. The prism PR is stationary. In addition, in the fourth exemplary embodiment, a rear focus type zoom lens, in which focusing is performed by moving the fourth lens unit L4 along the optical axis, is employed.

Focusing from an infinitely-distant object to a close object at the telephoto end is performed by moving the fourth lens unit L4 forward (to the front side) as indicated by the arrow 4c. The solid line curve 4a and the dotted line curve 4b for the fourth lens unit L4 indicate movement loci for correcting a variation of the image plane during zooming from the wide-angle end to the telephoto end when focusing on the infinitely-distant object and the close object, respectively.

An image can be displaced in a direction perpendicular to the optical axis by moving the entire third lens unit L3 of a positive refractive power or a part thereof to have a component perpendicular to the optical axis. As a result, a shake of a photographed image generated when the entire zoom lens is vibrated (tilted) is corrected. Thus, image stabilization is performed.

In the fourth exemplary embodiment, image stabilization is performed without adding an optical member such as a variable angle prism or a lens unit for image stabilization. As a result, it is possible to prevent the entire zoom lens from increasing in size. Although image stabilization is performed by moving the entire lens unit or apart thereof in a direction perpendicular to the optical axis in the fourth exemplary embodiment, an image shake can be corrected by moving the entire lens unit or a part thereof to have a component perpendicular to the optical axis. For example, if the lens barrel is allowed to have a complicated structure, image stabilization may be performed by rotating the entire lens unit or a part thereof to arrange the rotation center on the optical axis.

An aspheric surface is used in the third lens unit L3. As a result, it is possible to appropriately correct a variation of spherical aberration caused by the zooming. The third lens unit L3 includes a positive lens, a negative lens, and a cemented lens obtained by cementing positive and negative lenses. As a result, it is possible to reduce generation of decentering aberration during image stabilization.

In the lens cross-sectional view of the fifth exemplary embodiment, L1 denotes a first lens unit L1 of a positive refractive power, L2 denotes a second lens unit of a negative refractive power, L3 denotes a third lens unit of a positive refractive power, L4 denotes a fourth lens unit of a negative refractive power, and L5 denotes a fifth lens unit of a positive refractive power. The fifth exemplary embodiment relates to a five-unit zoom lens. The reflective unit (prism) PR is arranged between the second and third lens units L2 and L3. The aperture stop SP is arranged on the object side of the third lens unit L3. The flare cut stop FP is arranged on the image side of the third lens unit L3.

In the fifth exemplary embodiment, during zooming from the wide-angle end to the telephoto end, the first, second, third, and fifth lens units L1, L2, L3, and L5 are moved as indicated by the arrows. Specifically, during zooming from the wide-angle end to the telephoto end, the first lens unit L1 is moved towards the object side, the second lens unit L2 is moved towards the image side, and the third lens unit L3 is moved towards the object side as indicated by the arrows. The fifth lens unit L5 is moved towards the image side, towards the object side, and then, towards the image side with a locus having two inflection points.

The aperture stop SP and the flare cut stop FP are moved in synchronization with the third lens unit during zooming. The prism PR and the fourth lens unit L4 are stationary. However, the fourth lens unit L4 may be moved independently from the other lens units as necessary. In addition, in the fifth exemplary embodiment, a rear focus type, in which focusing is performed by moving the fifth lens unit L5 along the optical axis, is employed.

Focusing from an infinitely-distant object to a close object at the telephoto end is performed by moving the fifth lens unit L5 forward (to the front side) as indicated by the arrow 5c. The solid line curve 5a and the dotted line curve 5b for the fifth lens unit L5 represent movement loci for correcting a variation of the image plane during zooming from the wide-angle end to the telephoto end when focusing is performed for the infinitely-distant object and the close object, respectively. In addition, focusing may be performed using the fourth lens unit L4 of a negative refractive power. In this case, focusing is performed by moving the fourth lens unit L4 rearward (to the rear side).

An image can be displaced in a direction perpendicular to the optical axis such that the entire third lens unit L3 of a positive refractive power or a part thereof is moved to have a component perpendicular to the optical axis. As a result, it is possible to correct a shake of a photographed image generated when the entire zoom lens is vibrated (tilted). Thus, it is possible to perform image stabilization. In addition, the fourth lens unit L4 of a negative refractive power may be moved to have a component perpendicular to the optical axis in order to correct a shake of a photographed image.

In the fifth exemplary embodiment, image stabilization is performed without adding an optical member such as a variable angle prism or a lens unit for image stabilization. As a result, it is possible to prevent the entire zoom lens from increasing in size. Although image stabilization is performed by moving the entire lens unit or apart thereof to a direction perpendicular to the optical axis in the fifth exemplary embodiment, an image shake can be corrected by moving the entire zoom lens or a part thereof to have a component perpendicular to the optical axis.

For example, if the lens barrel is allowed to have a complicated structure, image stabilization may be performed by rotating the entire lens or a part thereof such that the rotation center is positioned on the optical axis.

The third lens unit L3 has an aspheric surface. As a result, it is possible to appropriately correct a variation of spherical aberration caused by the zooming. The third lens unit L3 includes a negative lens, a positive lens, and a cemented lens obtained by cementing positive and negative lenses. As a result, it is possible to alleviate generation of decentering aberration during image stabilization. Each of the fourth and fifth lens units L4 and L5 includes a single lens, so that it is possible to obtain a small size and a light weight in each lens unit.

The sixth exemplary embodiment relates to a six-unit zoom lens having the same refractive power arrangement as that of the first or second exemplary embodiment. The sixth exemplary embodiment is different from the first exemplary embodiment in that the fifth lens unit L5 is moved towards the object side during zooming from the wide-angle end to the telephoto end. Other configurations are similar to those of the first or second exemplary embodiment.

FIG. 14 illustrates a state that the size of the camera is reduced in a thickness direction by incorporating a reflective unit PR for bending light from the object side between the second and third lens units L2 and L3 of the first exemplary embodiment. This configuration may be similarly applied to the other exemplary embodiments.

In FIG. 14, like reference numerals denote like elements as in FIG. 1. Next, a digital camera in which the zoom lens according to each exemplary embodiment of the invention is used as a photographic optical system will be described with reference to FIG. 13. In FIG. 13, reference numeral 20 denotes a camera body, and reference numeral 21 denotes a photographic optical system including the zoom lens according to any one of the first to sixth exemplary embodiments.

PR denotes a prism as a reflective unit. Reference numeral 22 denotes a solid-state image sensor (photoelectric conversion element) such as a CCD sensor or a CMOS sensor, which is mounted on the camera body 20 and receives an object image formed by the photographic optical system 21. Reference numeral 23 denotes a memory for recording information corresponding to the object image photoelectrically converted by the solid-state image sensor 22. Reference numeral 24 denotes a viewfinder, which includes a liquid crystal display panel and the like to observe the object image formed on the solid-state image sensor 22. In this manner, if the zoom lens according to an exemplary embodiment of the invention is applied to an image pickup apparatus such as a digital camera, it is possible to implement an image pickup apparatus having a small size and high optical performance.

Next, Numerical Examples 1 to 6 corresponding to the first to sixth exemplary embodiments of the invention will be described. In each numerical example, i denotes the order of an optical surface from the object side. ri denotes a radius of curvature of the i-th optical surface (i-th surface), di denotes a distance between the i-th surface and the (i+1)th surface, and ndi and vdi denote a refractive index and an Abbe number, respectively, of a material of the i-th optical member for the d-line.

In addition, when k denotes eccentricity, A4, A6, A8, and A10 denote aspheric coefficients, and a displacement in the optical axis direction at the position having a height h from an optical axis is indicated by x with respect to the surface vertex, the aspheric shape can be expressed as follows:

$$X = (h^2/R)/[1+[1-(1+k)(h/R)^2]^{1/2}] + A4h^4 + A6h^6 + A8h^8 + A10h^{10},$$

where R denotes a paraxial radius of curvature. For example, "E-Z" means "$10^{-Z}$." In the numerical examples, the last four surfaces are surfaces of an optical block such as a filter and a phase plate. In each exemplary embodiment, the back focus (BF) is obtained by expressing the distance from the last lens surface to the paraxial image plane using an air-equivalent length. The entire lens length is obtained by adding a distance from the lens surface closest to the object side to the last lens surface and the back focus of the air-equivalent length. In addition, a relationship between each condition described above and each numerical example is shown in Table 1.

Numerical Example 1

| Surface data | | | | | |
|---|---|---|---|---|---|
| Surface number | r | d | nd | vd | Effective diameter |
| 1 | 45.734 | 0.88 | 1.84666 | 23.9 | 23.70 |
| 2 | 20.149 | 4.38 | 1.48749 | 70.2 | 21.20 |
| 3 | 615.302 | 0.06 | | | 19.71 |
| 4 | 22.979 | 2.63 | 1.83481 | 42.7 | 17.30 |
| 5 | 165.210 | Variable | | | 16.82 |
| 6 | 212.868 | 0.81 | 1.85135 | 40.1 | 12.80 |
| 7* | 6.632 | 3.50 | | | 9.46 |
| 8 | −11.068 | 0.50 | 1.88300 | 40.8 | 9.10 |
| 9 | 48.546 | 0.19 | | | 9.29 |
| 10 | 23.302 | 1.88 | 1.95906 | 17.5 | 9.47 |
| 11 | −29.843 | Variable | | | 9.46 |
| 12 | ∞ | 8.5 | 1.83400 | 37.2 | 7.49 |
| 13 | ∞ | 1.25 | | | 6.72 |
| 14 | −12.149 | 0.50 | 1.48749 | 70.2 | 7.38 |
| 15 | −18.702 | Variable | | | 7.38 |
| 16* | 9.558 | 2.13 | 1.55332 | 71.7 | 7.75 |
| 17* | −32.929 | 1.00 | | | 7.75 |
| 18 | ∞ | 1.25 | | | 7.27 (Stop) |
| 19 | 10.259 | 0.63 | 1.90366 | 31.3 | 7.75 |
| 20 | 7.347 | 1.75 | | | 7.75 |
| 21* | 69.223 | 3.25 | 1.58313 | 59.4 | 7.75 |
| 22 | −6.684 | 0.50 | 1.83400 | 37.2 | 7.75 |
| 23 | −14.284 | 0.75 | | | 7.75 |
| 24 | ∞ | Variable | | | 6.23 (Flare cut stop) |
| 25 | −71.936 | 0.50 | 1.88300 | 40.8 | 7.18 |
| 26 | 37.386 | Variable | | | 7.25 |
| 27 | 14.862 | 2.63 | 1.48749 | 70.2 | 9.97 |
| 28 | −31.560 | Variable | | | 9.92 |
| 29 | ∞ | 0.38 | 1.51633 | 64.1 | 12.50 |
| 30 | ∞ | 1.63 | | | 12.50 |
| 31 | ∞ | 0.63 | 1.51633 | 64.1 | 12.50 |
| 32 | ∞ | 1.5 | | | 12.50 |
| Image plane | ∞ | | | | |

| Aspheric data | | |
|---|---|---|
| 7th surface | | |
| K = 3.56807e−001 | A4 = −1.97016e−004 | A6 = −6.08143e−006 |
| A8 = 2.52505e−007 | A10 = −1.37257e−008 | |
| 16th surface | | |
| K = 1.44106e−001 | A4 = −2.02062e−004 | A6 = 3.63056e−006 |
| A8 = −4.20493e−007 | A10 = 1.46253e−008 | |
| 17th surface | | |
| K = 0.00000e+000 | A4 = 5.42362e−006 | A6 = 5.43526e−006 |
| A8 = −5.03430e−007 | A10 = 1.81855e−008 | |
| 21st surface | | |
| K = −1.54545e+001 | A4 = 5.50390e−005 | A6 = 3.40440e−006 |
| A8 = −1.89333e−007 | A10 = 1.09743e−008 | |

-continued

<table>
<tr><th colspan="4">Various data<br>Zoom ratio 13.18</th></tr>
<tr><th></th><th>Wide angle</th><th>Middle</th><th>Telephoto</th></tr>
<tr><td>Focal length</td><td>5.16</td><td>19.89</td><td>68.01</td></tr>
<tr><td>F-number</td><td>3.33</td><td>4.95</td><td>5.77</td></tr>
<tr><td>Angle of view</td><td>33.16</td><td>11.03</td><td>3.26</td></tr>
<tr><td>Image height</td><td>3.37</td><td>3.88</td><td>3.88</td></tr>
<tr><td>Entire lens length</td><td>80.95</td><td>87.27</td><td>93.85</td></tr>
<tr><td>BF</td><td>0.50</td><td>0.50</td><td>0.50</td></tr>
<tr><td>d5</td><td>0.54</td><td>9.02</td><td>18.14</td></tr>
<tr><td>d11</td><td>5.44</td><td>3.28</td><td>0.74</td></tr>
<tr><td>d15</td><td>16.71</td><td>3.15</td><td>0.43</td></tr>
<tr><td>d24</td><td>3.13</td><td>16.70</td><td>19.42</td></tr>
<tr><td>d26</td><td>7.86</td><td>5.77</td><td>8.82</td></tr>
<tr><td>d28</td><td>4.70</td><td>6.79</td><td>3.74</td></tr>
</table>

Numerical Example 2

<table>
<tr><th colspan="6">Surface data</th></tr>
<tr><th>Surface number</th><th>r</th><th>d</th><th>nd</th><th>vd</th><th>Effective diameter</th></tr>
<tr><td>1</td><td>55.250</td><td>0.88</td><td>2.00069</td><td>25.5</td><td>23.28</td></tr>
<tr><td>2</td><td>19.865</td><td>4.75</td><td>1.48749</td><td>70.2</td><td>20.85</td></tr>
<tr><td>3</td><td>−114.524</td><td>0.06</td><td></td><td></td><td>19.69</td></tr>
<tr><td>4</td><td>20.305</td><td>2.63</td><td>1.88300</td><td>40.8</td><td>17.15</td></tr>
<tr><td>5</td><td>154.202</td><td>Variable</td><td></td><td></td><td>16.51</td></tr>
<tr><td>6</td><td>376.132</td><td>0.81</td><td>1.85135</td><td>40.1</td><td>12.63</td></tr>
<tr><td>7*</td><td>6.336</td><td>3.50</td><td></td><td></td><td>9.29</td></tr>
<tr><td>8</td><td>−11.800</td><td>0.50</td><td>1.88300</td><td>40.8</td><td>8.98</td></tr>
<tr><td>9</td><td>66.529</td><td>0.19</td><td></td><td></td><td>9.17</td></tr>
<tr><td>10</td><td>21.573</td><td>1.88</td><td>1.95906</td><td>17.5</td><td>9.37</td></tr>
<tr><td>11</td><td>−39.247</td><td>Variable</td><td></td><td></td><td>9.33</td></tr>
<tr><td>12</td><td>∞</td><td>8.38</td><td>1.83400</td><td>37.2</td><td>7.26</td></tr>
<tr><td>13</td><td>∞</td><td>1.25</td><td></td><td></td><td>7.14</td></tr>
<tr><td>14</td><td>−23.619</td><td>0.50</td><td>1.48749</td><td>70.2</td><td>7.34</td></tr>
<tr><td>15</td><td>−70.831</td><td>Variable</td><td></td><td></td><td>7.51</td></tr>
<tr><td>16*</td><td>10.724</td><td>2.63</td><td>1.55332</td><td>71.7</td><td>8.13</td></tr>
<tr><td>17*</td><td>−37.728</td><td>1.00</td><td></td><td></td><td>8.13</td></tr>
<tr><td>18</td><td>∞</td><td>1.25</td><td></td><td></td><td>7.53 (Stop)</td></tr>
<tr><td>19</td><td>9.025</td><td>0.63</td><td>1.90366</td><td>31.3</td><td>8.13</td></tr>
<tr><td>20</td><td>7.221</td><td>2.25</td><td></td><td></td><td>8.13</td></tr>
<tr><td>21*</td><td>112.601</td><td>4.00</td><td>1.58313</td><td>59.4</td><td>8.13</td></tr>
<tr><td>22</td><td>−5.531</td><td>0.50</td><td>1.83481</td><td>42.7</td><td>8.13</td></tr>
<tr><td>23</td><td>−14.093</td><td>0.75</td><td></td><td></td><td>8.13</td></tr>
<tr><td>24</td><td>∞</td><td>Variable</td><td></td><td></td><td>6.41 (Flare cut stop)</td></tr>
<tr><td>25</td><td>−77.506</td><td>0.50</td><td>1.80518</td><td>25.4</td><td>7.39</td></tr>
<tr><td>26</td><td>45.811</td><td>Variable</td><td></td><td></td><td>7.48</td></tr>
<tr><td>27</td><td>17.841</td><td>2.63</td><td>1.60311</td><td>60.6</td><td>10.44</td></tr>
<tr><td>28</td><td>−43.264</td><td>Variable</td><td></td><td></td><td>10.32</td></tr>
<tr><td>29</td><td>∞</td><td>0.38</td><td>1.51633</td><td>64.1</td><td>12.50</td></tr>
<tr><td>30</td><td>∞</td><td>1.63</td><td></td><td></td><td>12.50</td></tr>
<tr><td>31</td><td>∞</td><td>0.63</td><td>1.51633</td><td>64.1</td><td>12.50</td></tr>
<tr><td>32</td><td>∞</td><td>0.5</td><td></td><td></td><td>12.50</td></tr>
<tr><td>Image plane</td><td>∞</td><td></td><td></td><td></td><td></td></tr>
</table>

<table>
<tr><th colspan="3">Aspheric data</th></tr>
<tr><th colspan="3">7th surface</th></tr>
<tr><td>K = 1.37037e−001</td><td>A4 = −1.21694e−004</td><td>A6 = −2.46723e−007</td></tr>
<tr><td>A8 = −2.29008e−008</td><td>A10 = −4.82840e−010</td><td></td></tr>
<tr><th colspan="3">16th surface</th></tr>
<tr><td>K = 3.53907e−001</td><td>A4 = −1.71593e−004</td><td>A6 = 4.83183e−006</td></tr>
<tr><td>A8 = −2.00888e−007</td><td>A10 = −6.58057e−010</td><td></td></tr>
<tr><th colspan="3">17th surface</th></tr>
<tr><td>K = 0.00000e+000</td><td>A4 = −3.96853e−006</td><td>A6 = 6.51084e−006</td></tr>
<tr><td>A8 = −2.69720e−007</td><td></td><td></td></tr>
<tr><th colspan="3">21st surface</th></tr>
<tr><td>K = 0.00000e+000</td><td>A4 = 1.75475e−004</td><td>A6 = 4.87085e−006</td></tr>
<tr><td>A8 = 1.42820e−008</td><td>A10 = 1.03278e−009</td><td></td></tr>
</table>

<table>
<tr><th colspan="4">Various data<br>Zoom ratio 16.98</th></tr>
<tr><th></th><th>Wide angle</th><th>Middle</th><th>Telephoto</th></tr>
<tr><td>Focal length</td><td>5.22</td><td>15.21</td><td>88.67</td></tr>
<tr><td>F-number</td><td>3.46</td><td>4.29</td><td>6.08</td></tr>
<tr><td>Angle of view</td><td>32.84</td><td>14.29</td><td>2.50</td></tr>
<tr><td>Image height</td><td>3.37</td><td>3.88</td><td>3.88</td></tr>
<tr><td>Entire lens length</td><td>88.40</td><td>89.79</td><td>99.29</td></tr>
<tr><td>BF</td><td>0.50</td><td>0.50</td><td>0.50</td></tr>
<tr><td>d5</td><td>0.55</td><td>7.56</td><td>17.07</td></tr>
<tr><td>d11</td><td>6.36</td><td>0.75</td><td>0.74</td></tr>
<tr><td>d15</td><td>18.27</td><td>8.37</td><td>0.42</td></tr>
<tr><td>d24</td><td>3.13</td><td>13.03</td><td>20.98</td></tr>
<tr><td>d26</td><td>10.41</td><td>6.41</td><td>11.87</td></tr>
<tr><td>d28</td><td>5.11</td><td>9.11</td><td>3.65</td></tr>
</table>

Numerical Example 3

<table>
<tr><th colspan="6">Surface data</th></tr>
<tr><th>Surface number</th><th>r</th><th>d</th><th>nd</th><th>vd</th><th>Effective diameter</th></tr>
<tr><td>1</td><td>38.333</td><td>0.88</td><td>1.84666</td><td>23.9</td><td>23.83</td></tr>
<tr><td>2</td><td>20.393</td><td>4.38</td><td>1.48749</td><td>70.2</td><td>21.53</td></tr>
<tr><td>3</td><td>270.389</td><td>0.06</td><td></td><td></td><td>19.91</td></tr>
<tr><td>4</td><td>22.406</td><td>2.63</td><td>1.77250</td><td>49.6</td><td>17.77</td></tr>
<tr><td>5</td><td>121.516</td><td>Variable</td><td></td><td></td><td>17.25</td></tr>
<tr><td>6</td><td>81.750</td><td>0.88</td><td>1.85135</td><td>40.1</td><td>13.04</td></tr>
<tr><td>7*</td><td>5.630</td><td>3.50</td><td></td><td></td><td>9.12</td></tr>
<tr><td>8</td><td>−14.052</td><td>0.50</td><td>1.88300</td><td>40.8</td><td>8.94</td></tr>
<tr><td>9</td><td>62.414</td><td>0.19</td><td></td><td></td><td>9.07</td></tr>
<tr><td>10</td><td>15.831</td><td>1.88</td><td>1.95906</td><td>17.5</td><td>9.30</td></tr>
<tr><td>11</td><td>−85.235</td><td>Variable</td><td></td><td></td><td>9.14</td></tr>
<tr><td>12</td><td>−119.710</td><td>0.50</td><td>1.48749</td><td>70.2</td><td>6.96</td></tr>
<tr><td>13</td><td>52.711</td><td>0.63</td><td></td><td></td><td>6.80</td></tr>
<tr><td>14</td><td>∞</td><td>7.75</td><td>1.83400</td><td>37.2</td><td>6.65</td></tr>
<tr><td>15</td><td>∞</td><td>Variable</td><td></td><td></td><td>6.31</td></tr>
<tr><td>16</td><td>∞</td><td>0.13</td><td></td><td></td><td>6.81 (Stop)</td></tr>
<tr><td>17*</td><td>8.125</td><td>2.38</td><td>1.76802</td><td>49.2</td><td>7.38</td></tr>
<tr><td>18*</td><td>−339.468</td><td>0.19</td><td></td><td></td><td>7.38</td></tr>
<tr><td>19</td><td>10.870</td><td>0.63</td><td>1.90366</td><td>31.3</td><td>7.38</td></tr>
<tr><td>20</td><td>6.175</td><td>1.75</td><td></td><td></td><td>7.38</td></tr>
<tr><td>21*</td><td>603.604</td><td>3.25</td><td>1.58313</td><td>59.4</td><td>7.38</td></tr>
<tr><td>22</td><td>−4.803</td><td>0.50</td><td>1.83400</td><td>37.2</td><td>7.38</td></tr>
<tr><td>23</td><td>−11.166</td><td>0.75</td><td></td><td></td><td>7.38</td></tr>
<tr><td>24</td><td>∞</td><td>Variable</td><td></td><td></td><td>5.99 (Flare cut stop)</td></tr>
<tr><td>25</td><td>−29.905</td><td>0.50</td><td>1.88300</td><td>40.8</td><td>7.41</td></tr>
<tr><td>26</td><td>−226.086</td><td>Variable</td><td></td><td></td><td>7.54</td></tr>
<tr><td>27</td><td>13.651</td><td>2.63</td><td>1.48749</td><td>70.2</td><td>10.22</td></tr>
<tr><td>28</td><td>−42.986</td><td>Variable</td><td></td><td></td><td>10.09</td></tr>
<tr><td>29</td><td>∞</td><td>0.38</td><td>1.51633</td><td>64.1</td><td>12.50</td></tr>
<tr><td>30</td><td>∞</td><td>1.63</td><td></td><td></td><td>12.50</td></tr>
<tr><td>31</td><td>∞</td><td>0.63</td><td>1.51633</td><td>64.1</td><td>12.50</td></tr>
<tr><td>32</td><td>∞</td><td>0.5</td><td></td><td></td><td>12.50</td></tr>
<tr><td>Image plane</td><td>∞</td><td></td><td></td><td></td><td></td></tr>
</table>

Aspheric data

7th surface

| | | |
|---|---|---|
| K = −2.17063e−003 | A4 = −4.27550e−005 | A6 = 7.68348e−006 |
| A8 = −4.89239e−007 | A10 = 1.51359e−008 | |

17th surface

| | | |
|---|---|---|
| K = 6.62493e−002 | A4 = −2.27638e−004 | A6 = 3.94832e−007 |
| A8 = −1.54196e−007 | A10 = −5.44903e−009 | |

18th surface

| | | |
|---|---|---|
| K = 0.00000e+000 | A4 = −4.38920e−005 | A6 = 4.64653e−006 |
| A8 = −4.11975e−007 | | |

21st surface

| | | |
|---|---|---|
| K = 0.00000e+000 | A4 = 2.41988e−004 | A6 = 9.08580e−006 |
| A8 = 7.24863e−008 | A10 = 5.86327e−009 | |

Various data
Zoom ratio 11.18

| | Wide angle | Middle | Telephoto |
|---|---|---|---|
| Focal length | 5.17 | 13.78 | 57.82 |
| F-number | 3.41 | 4.89 | 5.77 |
| Angle of view | 33.09 | 15.70 | 3.83 |
| Image height | 3.37 | 3.88 | 3.88 |
| Entire lens length | 78.39 | 82.27 | 91.10 |
| BF | 0.50 | 0.50 | 0.50 |
| d5 | 0.44 | 5.04 | 17.84 |
| d11 | 5.44 | 4.72 | 0.74 |
| d15 | 16.20 | 4.23 | 1.85 |
| d24 | 3.13 | 15.10 | 17.48 |
| d26 | 7.53 | 7.08 | 10.43 |
| d28 | 6.09 | 6.53 | 3.19 |

Numerical Example 4

Surface data

| Surface number | r | d | nd | vd | Effective diameter |
|---|---|---|---|---|---|
| 1 | 46.833 | 0.88 | 1.84666 | 23.9 | 23.91 |
| 2 | 19.904 | 4.38 | 1.48749 | 70.2 | 21.36 |
| 3 | −374.792 | 0.06 | | | 20.23 |
| 4 | 21.129 | 2.63 | 1.83481 | 42.7 | 17.89 |
| 5 | 128.748 | Variable | | | 17.44 |
| 6 | 346.613 | 0.88 | 1.85135 | 40.1 | 13.00 |
| 7* | 6.613 | 3.38 | | | 9.48 |
| 8 | −14.185 | 0.50 | 1.88300 | 40.8 | 9.12 |
| 9 | 17.357 | 0.19 | | | 9.16 |
| 10 | 14.353 | 2.00 | 1.95906 | 17.5 | 9.37 |
| 11 | −72.939 | Variable | | | 9.29 |
| 12 | ∞ | 9.00 | 1.83400 | 37.2 | 7.88 |
| 13 | ∞ | Variable | | | 6.59 |
| 14* | 9.136 | 2.13 | 1.55332 | 71.7 | 7.38 |
| 15* | −58.793 | 1.00 | | | 7.38 |
| 16 | ∞ | 1.25 | | | 6.39 (Stop) |
| 17 | 8.992 | 0.63 | 1.90366 | 31.3 | 7.38 |
| 18 | 6.670 | 1.75 | | | 7.38 |
| 19* | 92.448 | 3.25 | 1.58313 | 59.4 | 7.38 |
| 20 | −7.058 | 0.50 | 1.83400 | 37.2 | 7.38 |
| 21 | −20.616 | 0.75 | | | 7.38 |
| 22 | ∞ | Variable | | | 5.62 (Flare cut stop) |
| 23 | 11.299 | 0.63 | 1.77250 | 49.6 | 9.95 |
| 24 | 8.390 | 2.63 | 1.48749 | 70.2 | 9.61 |
| 25 | 59.941 | Variable | | | 9.42 |
| 26 | ∞ | 0.38 | 1.51633 | 64.1 | 12.50 |
| 27 | ∞ | 1.63 | | | 12.50 |
| 28 | ∞ | 0.63 | 1.51633 | 64.1 | 12.50 |
| 29 | ∞ | 0.5 | | | 12.50 |
| Image plane | ∞ | | | | |

Aspheric data

7th surface

| | | |
|---|---|---|
| K = 2.37193e−001 | A4 = −1.02322e−004 | A6 = −1.87083e−006 |
| A8 = 1.29457e−008 | A10 = −1.54018e−009 | |

14th surface

| | | |
|---|---|---|
| K = 1.71627e−001 | A4 = −1.86911e−004 | A6 = 1.30969e−006 |
| A8 = −3.87465e−007 | A10 = 2.76372e−008 | |

15th surface

| | | |
|---|---|---|
| K = 0.00000e+000 | A4 = −1.36039e−005 | A6 = 2.90982e−006 |
| A8 = −4.01768e−007 | A10 = 3.38589e−008 | |

19th surface

| | | |
|---|---|---|
| K = 1.65060e+002 | A4 = 5.45353e−005 | A6 = 2.68368e−006 |
| A8 = −1.59015e−007 | A10 = 1.74965e−008 | |

Various data
Zoom ratio 14.45

| | Wide angle | Middle | Telephoto |
|---|---|---|---|
| Focal length | 5.16 | 12.65 | 74.61 |
| F-number | 3.54 | 4.63 | 5.77 |
| Angle of view | 33.14 | 17.03 | 2.97 |
| Image height | 3.37 | 3.88 | 3.88 |
| Entire lens length | 81.43 | 83.16 | 93.35 |
| BF | 0.50 | 0.50 | 0.50 |
| d5 | 0.51 | 4.88 | 16.89 |
| d11 | 5.19 | 2.55 | 0.73 |
| d13 | 19.83 | 7.81 | 1.04 |
| d22 | 10.82 | 16.16 | 29.23 |
| d25 | 3.58 | 10.25 | 3.95 |

Numerical Example 5

Surface data

| Surface number | r | d | nd | vd | Effective diameter |
|---|---|---|---|---|---|
| 1 | 37.309 | 0.88 | 1.84666 | 23.9 | 23.65 |
| 2 | 20.147 | 4.38 | 1.48749 | 70.2 | 21.36 |
| 3 | 380.756 | 0.06 | | | 19.77 |
| 4 | 21.774 | 2.63 | 1.77250 | 49.6 | 17.79 |
| 5 | 113.710 | Variable | | | 17.28 |
| 6 | 127.756 | 0.88 | 1.85135 | 40.1 | 12.54 |
| 7* | 5.971 | 3.25 | | | 8.94 |
| 8 | −14.727 | 0.50 | 1.88300 | 40.8 | 8.66 |
| 9 | 18.733 | 0.19 | | | 8.70 |
| 10 | 13.172 | 1.88 | 1.95906 | 17.5 | 8.93 |
| 11 | −127.366 | Variable | | | 8.81 |
| 12 | ∞ | 8.13 | 1.83400 | 37.2 | 7.14 |
| 13 | ∞ | Variable | | | 6.18 |
| 14 | ∞ | 0.13 | | | 6.69 (Stop) |
| 15* | 8.210 | 2.38 | 1.76802 | 49.2 | 7.38 |
| 16* | 155.976 | 0.19 | | | 7.38 |
| 17 | 10.276 | 0.63 | 1.90366 | 31.3 | 7.38 |
| 18 | 6.106 | 1.75 | | | 7.38 |
| 19* | −210.706 | 3.25 | 1.58313 | 59.4 | 7.38 |
| 20 | −4.782 | 0.50 | 1.83400 | 37.2 | 7.38 |
| 21 | −10.679 | 0.75 | | | 7.38 |
| 22 | ∞ | Variable | | | 6.06 (Flare cut stop) |
| 23 | −51.132 | 0.50 | 1.88300 | 40.8 | 7.72 |
| 24 | −624.457 | Variable | | | 7.80 |
| 25 | 16.874 | 2.63 | 1.48749 | 70.2 | 10.27 |

-continued

| 26 | −34.455 | Variable |  |  | 10.17 |
| 27 | ∞ | 0.38 | 1.51633 | 64.1 | 12.50 |
| 28 | ∞ | 1.63 |  |  | 12.50 |
| 29 | ∞ | 0.63 | 1.51633 | 64.1 | 12.50 |
| 30 | ∞ | 0.5 |  |  | 12.50 |
| Image plane | ∞ |  |  |  |  |

Aspheric data

7th surface

K = 7.52150e−002   A4 = −3.93686e−005   A6 = 8.95884e−006
A8 = −6.16794e−007   A10 = 2.30798e−008

15th surface

K = 8.62579e−002   A4 = −2.06264e−004   A6 = −2.03365e−006
A8 = −2.51572e−007   A10 = 1.20108e−010

16th surface

K = 0.00000e+000   A4 = −5.65666e−005   A6 = 1.02907e−006
A8 = −6.23153e−007   A10 = 1.47642e−008

19th surface

K = 0.00000e+000   A4 = 2.26845e−004   A6 = 1.29837e−005
A8 = −6.94950e−007   A10 = 4.57693e−008

Various data
Zoom ratio 13.19

|  | Wide angle | Middle | Telephoto |
| --- | --- | --- | --- |
| Focal length | 5.16 | 11.56 | 68.01 |
| F-number | 3.50 | 4.68 | 5.77 |
| Angle of view | 33.18 | 18.53 | 3.26 |
| Image height | 3.37 | 3.88 | 3.88 |
| Entire lens length | 80.12 | 81.82 | 92.58 |
| BF | 0.50 | 0.50 | 0.50 |
| d5 | 0.52 | 3.74 | 17.8 |
| d11 | 5.57 | 4.04 | 0.74 |
| d13 | 17.86 | 7.16 | 2.05 |
| d22 | 3.13 | 13.83 | 18.94 |
| d24 | 8.86 | 7.97 | 10.84 |
| d26 | 5.63 | 6.51 | 3.64 |

Numerical Example 6

Surface data

| Surface number | r | d | nd | vd | Effective diameter |
| --- | --- | --- | --- | --- | --- |
| 1 | 57.394 | 0.88 | 1.84666 | 23.9 | 23.61 |
| 2 | 21.123 | 4.38 | 1.48749 | 70.2 | 21.15 |
| 3 | −254.232 | 0.06 |  |  | 19.87 |
| 4 | 22.890 | 2.63 | 1.88300 | 40.8 | 17.44 |
| 5 | 139.584 | Variable |  |  | 16.80 |
| 6 | 306.573 | 0.81 | 1.85135 | 40.1 | 13.08 |
| 7* | 6.295 | 3.63 |  |  | 9.56 |
| 8 | −11.818 | 0.50 | 1.88300 | 40.8 | 9.33 |
| 9 | 99.890 | 0.19 |  |  | 9.59 |
| 10 | 21.587 | 1.88 | 1.95906 | 17.5 | 9.85 |
| 11 | −34.889 | Variable |  |  | 9.83 |
| 12 | ∞ | 8.75 | 1.83400 | 37.2 | 7.88 |
| 13 | ∞ | 1.25 |  |  | 7.05 |
| 14 | −26.724 | 0.50 | 1.48749 | 70.2 | 7.75 |
| 15 | −108.223 | Variable |  |  | 7.75 |
| 16* | 9.418 | 2.38 | 1.55332 | 71.7 | 8.25 |
| 17* | −50.324 | 1.00 |  |  | 8.25 |
| 18 | ∞ | 1.25 |  |  | 7.39 (Stop) |
| 19 | 9.604 | 0.63 | 1.90366 | 31.3 | 8.25 |
| 20 | 7.027 | 1.88 |  |  | 8.25 |
| 21* | 45.352 | 3.63 | 1.58313 | 59.4 | 8.25 |
| 22 | −5.602 | 0.50 | 1.83400 | 37.2 | 8.25 |

-continued

| 23 | −12.961 | 0.75 |  |  | 8.25 |
| 24 | ∞ | Variable |  |  | 6.19 (Flare cut stop) |
| 25 | −66.081 | 0.50 | 1.77250 | 49.6 | 6.38 |
| 26 | 34.275 | Variable |  |  | 6.41 |
| 27 | 17.206 | 2.63 | 1.48749 | 70.2 | 10.45 |
| 28 | −27.674 | Variable |  |  | 10.38 |
| 29 | ∞ | 0.38 | 1.51633 | 64.1 | 12.50 |
| 30 | ∞ | 1.63 |  |  | 12.50 |
| 31 | ∞ | 0.63 | 1.51633 | 64.1 | 12.50 |
| 32 | ∞ | 0.5 |  |  | 12.50 |
| Image plane | ∞ |  |  |  |  |

Aspheric data

7th surface

K = 8.19995e−002   A4 = −7.55869e−005   A6 = −2.98397e−006
A8 = 1.29543e−007   A10 = −3.02166e−009

16th surface

K = 2.30102e−001   A4 = −1.98424e−004   A6 = 4.09245e−006
A8 = −2.01826e−007   A10 = −3.68361e−009

17th surface

K = 0.00000e+000   A4 = −8.49659e−008   A6 = 7.51034e−006
A8 = −3.97670e−007

21st surface

K = 3.48251e+001   A4 = 1.01068e−004   A6 = 5.65942e−006
A8 = −1.69562e−007   A10 = 5.90897e−009

Various data
Zoom ratio 15.11

|  | Wide angle | Middle | Telephoto |
| --- | --- | --- | --- |
| Focal length | 5.16 | 17.7 | 77.90 |
| F-number | 3.21 | 4.31 | 5.77 |
| Angle of view | 33.18 | 12.35 | 2.85 |
| Image height | 3.37 | 3.88 | 3.88 |
| Entire lens length | 82.73 | 87.06 | 95.82 |
| BF | 0.50 | 0.50 | 0.50 |
| d5 | 0.53 | 9.29 | 18.24 |
| d11 | 5.36 | 0.93 | 0.74 |
| d15 | 18.00 | 6.54 | 0.42 |
| d24 | 3.13 | 9.63 | 12.59 |
| d26 | 7.14 | 8.31 | 16.30 |
| d28 | 4.88 | 8.67 | 3.83 |

TABLE 1

| Examples | Conditions | | | | | | |
| --- | --- | --- | --- | --- | --- | --- | --- |
|  | (1) | (2) | (3) | (4) | (5) | (6) | (7) |
| Example 1 | 4.94 | 2.67 | 0.26 | 3.16 | 0.101 | 0.22 | 1.10 |
| Example 2 | 7.04 | 2.46 | 0.19 | 3.42 | 0.076 | 0.19 | 1.08 |
| Example 3 | 4.72 | 2.16 | 0.30 | 2.77 | 0.124 | 0.27 | 0.92 |
| Example 4 | 6.23 | 2.38 | 0.22 | 3.64 | 0.081 | 0.24 | 1.04 |
| Example 5 | 5.39 | 2.24 | 0.25 | 3.07 | 0.088 | 0.25 | 0.94 |
| Example 6 | 6.13 | 2.21 | 0.23 | 3.41 | 0.094 | 0.20 | 1.15 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-170956 filed Aug. 4, 2011, which is hereby incorporated by reference herein in its entirety.

What is claimed is:

1. A zoom lens comprising, in order from an object side to an image side, a first lens unit of a positive refractive power, a second lens unit of a negative refractive power, a reflective unit configured to bend an optical axis, and a rear lens group including two or more lens units, the reflective unit being stationary during zooming, the first and second lens units and two or more lens units of the rear lens group being moved during zooming, wherein following conditions are satisfied:

$$4.3<\beta 2t/\beta 2w<12.0,$$

and $$2.1<\beta Rt/\beta Rw<3.0,$$

where β2w and β2t denote lateral magnifications of the second lens unit at a wide-angle end and a telephoto end, respectively, and βRw and βRt denote lateral magnifications at the wide-angle end and the telephoto end, respectively, of a lens unit having a greatest variable power ratio out of the rear lens group.

2. The zoom lens according to claim 1, wherein following conditions are satisfied:

$$0.15<|m1-m2|/ft<0.35,$$

and $$2.7<|mR|/fw<4.5,$$

wherein m1 denotes a movement amount of the first lens unit for zooming from the wide-angle end to the telephoto end, m2 denotes a movement amount of the second lens unit for zooming from the wide-angle end to the telephoto end, mR denotes a movement amount of the lens unit having the greatest variable power ratio out of the rear lens group for zooming from the wide-angle end to the telephoto end, and fw and ft denote focal lengths of the entire zoom lens at the wide-angle end and the telephoto end, respectively.

3. The zoom lens according to claim 1, wherein the following condition is satisfied:

$$0.060<|f2|/ft<0.130,$$

where f2 denotes a focal length of the second lens unit, and ft denotes a focal length of the entire zoom lens at the telephoto end.

4. The zoom lens according to claim 1, wherein the following condition is satisfied:

$$0.15<|fR|/ft<0.30,$$

where fR denotes a focal length of the lens unit having the greatest variable power ratio out of the rear lens group, and ft denotes a focal length of the entire zoom lens at the telephoto end.

5. The zoom lens according to claim 1, wherein the following condition is satisfied:

$$0.85<|mR/fR|<1.50,$$

where mR denotes a movement amount of the lens unit having the greatest variable power ratio out of the rear lens group for zooming from the wide-angle end to the telephoto end, and fR denotes a focal length of the lens unit having the greatest variable power ratio out of the rear lens group.

6. The zoom lens according to claim 1, wherein the rear lens group includes, in order from the object side to the image side, a third lens unit of a negative refractive power, a fourth lens unit of a positive refractive power, a fifth lens unit of a negative refractive power, and a sixth lens unit of a positive refractive power, and wherein the third and the fifth lens units do not move for zooming, and the fourth and the sixth lens units move during zooming.

7. The zoom lens according to claim 1, wherein the rear lens group includes, in order from the object side to the image side, a third lens unit of a positive refractive power and a fourth lens unit of a positive refractive power, and wherein the third and the fourth lens units move during zooming.

8. The zoom lens according to claim 1, wherein the rear lens group includes, in order from the object side to the image side, a third lens unit of a positive refractive power, a fourth lens unit of a negative refractive power, and a fifth lens unit of a positive refractive power, and wherein the fourth lens unit does not move for zooming, and the third and the fifth lens units move during zooming.

9. The zoom lens according to claim 1, wherein the rear lens group includes, in order from the object side to the image side, a third lens unit of a negative refractive power, a fourth lens unit of a positive refractive power, a fifth lens unit of a negative refractive power, and a sixth lens unit of a positive refractive power, and wherein the third lens unit does not move for zooming, and the fourth, the fifth, and the sixth lens units move during zooming.

10. The zoom lens according to claim 1, further comprising a third lens unit of a negative refractive power located between the second lens unit and the reflective unit.

11. The zoom lens according to claim 10, wherein the rear lens group includes, in order from the object side to the image side, a fourth lens unit of a positive refractive power, a fifth lens unit of a negative refractive power, and a sixth lens unit of a positive refractive power, and wherein the third and the fifth lens units do not move for zooming, and the fourth and the sixth lens units move during zooming.

12. The zoom lens according to claim 1, wherein the zoom lens is configured to form an image on a solid-state image sensor.

13. An image pickup apparatus comprising:
a zoom lens; and
a solid-state image sensor configured to receive an image formed by the zoom lens;
wherein the zoom lens comprises, in order from an object side to an image side:
a first lens unit of a positive refractive power, a second lens unit of a negative refractive power, a reflective unit configured to bend an optical axis, and a rear lens group including two or more lens units, the reflective unit being stationary during zooming, the first and second lens units and two or more lens units of the rear lens group being moved during zooming,
wherein following conditions are satisfied:

$$4.3<\beta 2t/\beta 2w<12.0,$$

and $$2.1<\beta Rt/\beta Rw<3.0,$$

where β2w and β2t denote lateral magnifications of the second lens unit at a wide-angle end and a telephoto end, respectively, and βRw and βRt denote lateral magnifications at the wide-angle end and the telephoto end, respectively, of a lens unit having a greatest variable power ratio out of the rear lens group.

* * * * *